US011508158B2

(12) United States Patent
Ju et al.

(10) Patent No.: US 11,508,158 B2
(45) Date of Patent: Nov. 22, 2022

(54) ELECTRONIC DEVICE AND METHOD FOR VEHICLE DRIVING ASSISTANCE

(71) Applicant: Samsung Electronics Co., Ltd., Suwon-si (KR)

(72) Inventors: Jaeyong Ju, Suwon-si (KR); Myungsik Kim, Suwon-si (KR); Seunghoon Han, Suwon-si (KR); Taegyu Lim, Suwon-si (KR); Boseok Moon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/978,866

(22) PCT Filed: Mar. 6, 2019

(86) PCT No.: PCT/KR2019/002597
§ 371 (c)(1),
(2) Date: Sep. 8, 2020

(87) PCT Pub. No.: WO2019/172645
PCT Pub. Date: Sep. 12, 2019

(65) Prior Publication Data
US 2021/0049381 A1 Feb. 18, 2021

(30) Foreign Application Priority Data
Mar. 8, 2018 (KR) .................. 10-2018-0027708

(51) Int. Cl.
*G06V 20/58* (2022.01)
*B60W 30/095* (2012.01)
(Continued)

(52) U.S. Cl.
CPC .......... *G06V 20/58* (2022.01); *B60W 30/095* (2013.01); *G06N 3/02* (2013.01); *G06T 7/246* (2017.01);
(Continued)

(58) Field of Classification Search
USPC ....................................... 382/103
See application file for complete search history.

(56) References Cited

U.S. PATENT DOCUMENTS

| 8,812,226 B2 * | 8/2014 | Zeng ............... G01S 13/931 |
| | | 382/103 |
| 10,745,009 B2 * | 8/2020 | Jang ............... B60W 30/0956 |

(Continued)

FOREIGN PATENT DOCUMENTS

| KR | 10-2014-0048539 A | 4/2014 |
| KR | 10-2017-0027093 A | 3/2017 |

(Continued)

OTHER PUBLICATIONS

International Search Report and written opinion dated Jun. 19, 2019, issued in International Application No. PCT/KR2019/002597.
(Continued)

*Primary Examiner* — Ishrat I Sherali
(74) *Attorney, Agent, or Firm* — Jefferson IP Law, LLP

(57) ABSTRACT

An electronic device for and a method of assisting vehicle driving are provided. The electronic device includes a plurality of cameras configured to capture a surrounding image around a vehicle; at least one sensor configured to sense an object around the vehicle; and a processor configured to obtain, during vehicle driving, a plurality of image frames as the surrounding image of the vehicle is captured based on a preset time interval by using the plurality of cameras, based on the object is sensed using the at least one sensor while the vehicle is being driven, extract an image frame corresponding to a time point when and a location where the object has been sensed, from among the obtained plurality of image frames, perform object detection from the extracted image frame, and perform object tracking of tracking a change in the object, from a plurality of image frames obtained after the extracted image frame. The present disclosure also
(Continued)

relates to an artificial intelligence (AI) system that utilizes a machine learning algorithm, such as deep learning, and applications of the AI system.

16 Claims, 19 Drawing Sheets

(51) Int. Cl.
  *G06T 7/246* (2017.01)
  *G06N 3/02* (2006.01)
(52) U.S. Cl.
  CPC ............... *B60W 2420/42* (2013.01); *G06T 2207/20084* (2013.01); *G06T 2207/30261* (2013.01); *G06V 2201/07* (2022.01)

(56) References Cited

U.S. PATENT DOCUMENTS

| | | | | |
|---|---|---|---|---|
| 11,301,698 | B2* | 4/2022 | Corcoran | G06V 10/147 |
| 2008/0273752 | A1 | 11/2008 | Zhu et al. | |
| 2010/0104199 | A1* | 4/2010 | Zhang | G08G 1/165 |
| | | | | 382/199 |
| 2010/0191391 | A1 | 7/2010 | Zeng | |
| 2014/0168377 | A1* | 6/2014 | Cluff | H04N 13/246 |
| | | | | 348/47 |
| 2017/0185763 | A1 | 6/2017 | Jeromin et al. | |
| 2017/0185872 | A1 | 6/2017 | Chakraborty | |
| 2017/0206431 | A1 | 7/2017 | Sun et al. | |
| 2017/0206669 | A1 | 7/2017 | Saleemi et al. | |
| 2017/0220876 | A1* | 8/2017 | Gao | G06V 20/58 |
| 2017/0220879 | A1* | 8/2017 | Nakamura | G06K 9/4604 |
| 2020/0142421 | A1* | 5/2020 | Palanisamy | G06N 3/0445 |

FOREIGN PATENT DOCUMENTS

| | | |
|---|---|---|
| KR | 10-2017-0050362 A | 5/2017 |
| KR | 10-2017-0078914 A | 7/2017 |

OTHER PUBLICATIONS

Korean Office Action dated Jan. 23, 2022, issued in Korean Patent Application No. 10-2018-0027708.
European Search Report dated Feb. 23, 2021, issued in European Application No. 19764996.5.

* cited by examiner

ELECTRONIC DEVICE AND METHOD FOR VEHICLE DRIVING ASSISTANCE

TECHNICAL FIELD

The present disclosure relates to an electronic device for and a method of assisting vehicle driving.

The present disclosure also relates to an artificial intelligence (AI) system that utilizes a machine learning algorithm, such as deep learning, and applications of the AI system.

BACKGROUND ART

Due to the convergence of information and communication technology and the automotive industry, the smartification of vehicles has progressed rapidly. Due to this smartification, vehicles have evolved from simple mechanical devices into smart cars, and particularly, autonomous driving has been regarded as a key technology for smart cars.

Autonomous driving is a technology that allows a vehicle to travel autonomously to a destination without manipulation of a steering wheel, a gas pedal, a brake, etc. by a driver. These days, a variety of additional functions related to autonomous driving have been continuously developed, and research on methods capable of providing a safe autonomous driving environment to a driver or a passenger by controlling a vehicle by recognizing and determining a driving environment by using various types of data is underway.

Artificial intelligence (AI) systems are computer systems configured to achieve human-level intelligence and train themselves and make determinations spontaneously to become smarter, in contrast to existing rule-based smart systems. Because the recognition rates of AI systems improve and the AI systems more accurately understand a user's preferences the more they are used, existing rule-based smart systems have been gradually replaced by deep-learning AI systems.

AI technology includes machine learning (deep learning) and element technologies employing the machine learning.

Machine learning is an algorithm technology that self-classifies/learns the characteristics of input data, and each of the element technologies is a technology of mimicking functions of human brains, such as perception and determination, by using a machine learning algorithm, such as deep learning, and includes technical fields, such as linguistic understanding, visual understanding, deduction/prediction, knowledge representation, and operation control.

Various fields to which AI technology is applied are as follows. Linguistic understanding is a technique of recognizing a language/character of a human and applying/processing the language/character of a human, and includes natural language processing, machine translation, a conversation system, questions and answers, voice recognition/synthesis, and the like. Visual understanding is a technique of recognizing and processing an object like human vision, and includes object recognition, object tracking, image search, human recognition, scene understanding, space understanding, image improvement, and the like. Deduction/prediction is a technology of logically performing deduction and prediction by determining information, and includes knowledge/probability-based deduction, optimization prediction, a preference-based plan, recommendation, and the like. Knowledge representation is a technique of automatically processing human experience information as knowledge data, and includes knowledge establishment (data generation/classification), knowledge management (data utilization), and the like. Operation control is a technique of controlling autonomous driving of a vehicle and motion of a robot, and includes motion control (navigation, collision avoidance, and driving), manipulation control (behavior control), and the like.

DESCRIPTION OF EMBODIMENTS

Technical Problem

Provided are an electronic device for and a method of assisting vehicle driving. Provided are non-transitory computer-readable recording media having recorded thereon computer programs, which, when executed by a computer, perform the method. Additional aspects will be set forth in part in the description which follows and, in part, will be apparent from the description, or may be learned by practice of the presented embodiments.

Solution to Problem

According to an aspect of the present disclosure, an electronic device for assisting vehicle driving includes a plurality of cameras configured to capture a surrounding image around a vehicle; at least one sensor configured to sense an object around the vehicle; and a processor configured to obtain, during vehicle driving, a plurality of image frames as the surrounding image of the vehicle is captured based on a preset time interval by using the plurality of cameras, as the object is sensed using the at least one sensor during vehicle driving, extract an image frame corresponding to a time point when and a location where the object has been sensed, from among the obtained plurality of image frames, perform object detection from the extracted image frame, and perform object tracking of tracking a change in the object, from a plurality of image frames obtained after the extracted image frame.

According to another aspect of the present disclosure, an operation method of an electronic device for assisting driving of a vehicle includes obtaining a plurality of image frames as a surrounding image of the vehicle is captured based on a preset time interval by using a plurality of cameras, while the vehicle is being driven; as the object is sensed using at least one sensor during vehicle driving, extracting an image frame corresponding to a time point when and a location where the object has been sensed, from among the obtained plurality of image frames; performing object detection from the extracted image frame; and performing object tracking of tracking a change in the object, from a plurality of image frames obtained after the extracted image frame.

According to another aspect of the present disclosure, a non-transitory computer-readable recording medium has recorded thereon a computer program for executing the above-described operation method.

MODE OF DISCLOSURE

Although general terms widely used at present were selected for describing the disclosure in consideration of the functions thereof, these general terms may vary according to intentions of one of ordinary skill in the art, case precedents, the advent of new technologies, and the like. Terms arbitrarily selected by the applicant of the disclosure may also be used in a specific case. In this case, their meanings need to be given in the detailed description. Hence, the terms must be defined based on their meanings and the contents of the entire specification, not by simply stating the terms.

The terms "comprises" and/or "comprising" or "includes" and/or "including" when used in this specification, specify the presence of stated elements, but do not preclude the presence or addition of one or more other elements. In addition, terms such as " . . . unit", " . . . module", or the like refer to units that perform at least one function or operation, and the units may be implemented as hardware or software or as a combination of hardware and software.

Examples of the disclosure are described in detail herein with reference to the accompanying drawings so that the disclosure may be easily performed by one of ordinary skill in the art to which the disclosure pertains. The disclosure may, however, be embodied in many different forms and should not be construed as being limited to the examples set forth herein.

Embodiments now will be described more fully hereinafter with reference to the accompanying drawings.

Figure 1:
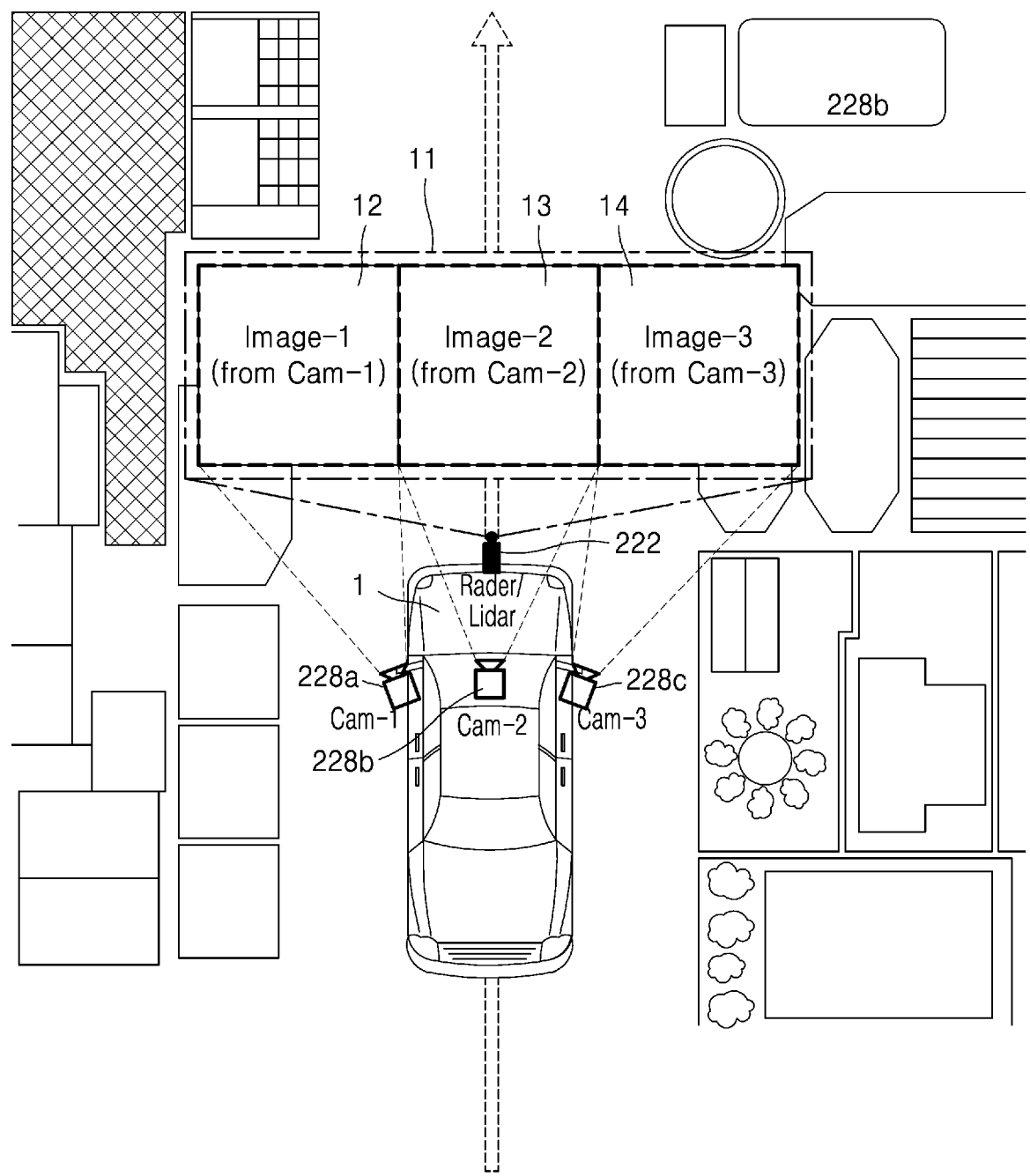
FIG. 1 is a diagram for schematically describing an example of an operation of an electronic device for assisting vehicle driving, according to an embodiment.

FIG. 1 is a diagram for schematically describing an example of an operation of an electronic device for assisting vehicle driving, according to an embodiment.

Herein, a vehicle 1 of FIG. 15 (hereinafter, a vehicle 1) may include an electronic device 100 of FIGS. 13 through 15 (hereinafter, an electronic device 100) that assists or controls driving of the vehicle 1. The electronic device 100 according to embodiment may be mounted on the vehicle 1 and operate so that the vehicle 1 may drive autonomously or autonomously control a portion of a driving operation. For example, the vehicle 1 may be implemented to perform functions of autonomous driving systems or advanced driver assistance systems (ADASs).

A vehicle capable of autonomous driving or autonomous control of at least some functions may provide a more stable driving environment in order to more accurately and quickly recognize an object on a driving path during vehicle driving.

The electronic device 100 mounted on the vehicle 1 according to an embodiment may photograph the surroundings of the vehicle 1 by using an image sensor 228 of FIG. 14 (hereinafter, an image sensor 228 or a camera 228) while the vehicle 1 is driving, and may detect and track an object (e.g., a pedestrian, a vehicle, or a road sign on a road) from a captured surround image.

An object according to an embodiment is an object that may affect driving of a vehicle and may be observed in the surroundings (front side, rear side, lateral side, and the like) of the vehicle, and may include, but is not limited to, a pedestrian, other vehicles, an obstacle on a driving path, and a road sign.

Figure 14:
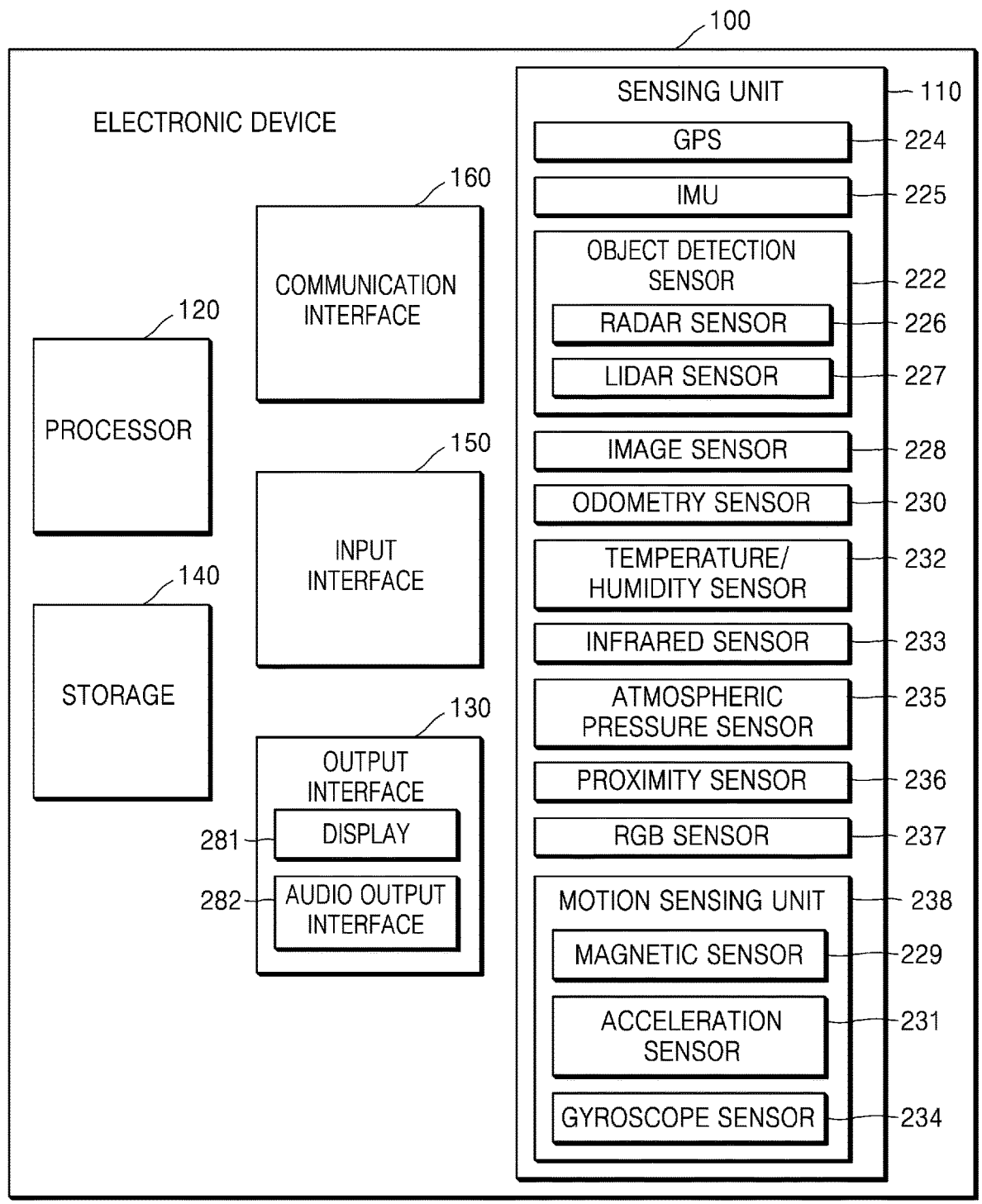
FIG. 14 is a detailed block diagram of an electronic device according to an embodiment.

The image sensor 228 of FIG. 14 may be a still camera or video camera configured to record an external environment of the vehicle 1. For example, the image sensor 228 may include a plurality of cameras, and the plurality of cameras may be arranged at a plurality of locations inside or outside the vehicle 1.

According to an embodiment, the electronic device 100 mounted on the vehicle 1 may photograph the surroundings by using a plurality of cameras 228, and may perform object detection by using a data recognition model based on deep learning in order to detect an object from a plurality of image frames obtained by photographing the surroundings of the vehicle 1.

According to an embodiment, 'object detection' may be image processing of detecting an object (e.g., a pedestrian, a vehicle, or a road sign on a road) included in an image frame. Object detection may be image processing of extracting a candidate region within an image frame to detect an object from the image frame, and estimating a type and a location of an object within the candidate region by using a trained data recognition model. According to an embodiment, a data recognition model based on a convolutional neural network (CNN) or the like may be used in object detection.

Object detection may be performed by a graphics dedicated processor (e.g., a graphics processing unit (GPU)) capable of multiple operations. Object detection may be performed by a dedicated hardware chip for artificial intelligence (AI), but embodiments are not limited thereto.

According to an embodiment, as object detection from an image frame is performed, more accurate and precise object detection may be achieved.

According to an embodiment, the electronic device 100 may track a change in the detected object by performing object tracking on the plurality of image frames obtained using the camera 228 while the vehicle 1 is driving.

'Object tracking' according to an embodiment may be image processing for tracking a change in the location of an object included in a series of image frames obtained using a camera.

Object tracking may be performed by a general-use processor (e.g., a central processing unit (CPU)). Object tracking may be image processing of tracking a change in the object included in the series of image frames by using characteristic information such as the size, shape, outline, and color of the object in the series of image frames.

According to an embodiment, the electronic device 100 may detect objects around the vehicle 1 by using an object detection sensor 222 of FIG. 14 such as a RADAR sensor 226 of FIG. 14 or a LIDAR sensor 227 of FIG. 14 (hereinafter, an object detection sensor 222) while the vehicle 1 is driving.

The RADAR sensor 226 of FIG. 14 may be a sensor configured to sense objects within an environment where the vehicle 1 is located, by using a wireless signal. The RADAR sensor 226 may also be configured to sense speeds and/or directions of objects.

The LIDAR sensor 227 of FIG. 14 may be a sensor configured to sense the objects within the environment where the vehicle 1 is located, by using laser. The LIDAR sensor 227 may output a laser beam by using a laser outputter, and may obtain a reflection signal from an object through at least one laser receiver.

Referring to FIG. 1, the vehicle 1 according to an embodiment may include a plurality of cameras 228a, 228b, and 228c and the object detection sensor 222 (e.g., a RADAR sensor and a LIDAR sensor).

While the vehicle 1 is driving, the electronic device 100 may obtain a plurality of image frames by using the plurality of cameras 228a, 228b, and 228c.

The plurality of cameras 228a, 228b, and 228c may photograph different regions around the vehicle 1 according to, for example, a location where each of the plurality of cameras 228a, 228b, and 228c are mounted on the vehicle 1, a direction in which each of the plurality of cameras 228a, 228b, and 228c are mounted on the vehicle 1, and the angle of view of a camera lens of each of the plurality of cameras 228a, 228b, and 228c. For example, the electronic device 100 may obtain a plurality of image frames for a first region 12 photographed using the first camera 228a, a second region 13 photographed using the second camera 228b, and a third region 14 photographed using the third camera 228c.

The object detection sensor 222 may detect an object from a wider region 11 around the vehicle, including the regions photographed by the plurality of cameras 228a, 228b, and 228c.

According to an embodiment, the object may include, but is not limited to, a pedestrian, other vehicles, an obstacle, and a road sign on the driving path.

According to an embodiment, the electronic device 100 may perform object detection for detecting an object included in each of a plurality of image frames obtained using the plurality of cameras 228a, 228b, and 228c or object tracking for tracking a change in the object included in each of the plurality of image frames, with respect to each of the plurality of image frames, based on a preset cycle.

According to an embodiment, object detection that is performed by a GPU and requires many calculations, and object tracking that is performed by a CPU and requires relatively few calculations may be efficiently distributed for a plurality of image frames obtained using a plurality of cameras, and thus stable and efficient object detection and tracking may be achieved.

According to an embodiment, highly-efficient and highly-accurate object detection may be stably achieved even within restricted resources of an embedded system, by efficiently setting the period of object detection, for the plurality of image frames obtained using the plurality of cameras.

According to an embodiment, when the electronic device 100 detects existence of an object (e.g., a pedestrian) on the driving path by using the object detection sensor 222 (e.g., a RADAR sensor) while the vehicle 1 is driving, the electronic device 100 may extract an image frame that is estimated to include the detected object, from among the plurality of image frames captured using the plurality of cameras 228. The electronic device 100 may perform object detection from the extracted image frame.

According to an embodiment, the electronic device 100 may prevent a risk of object detection delay or object non-detection and may achieve stable and highly-accurate object detection even in an environment where object detection is not performed with respect to each of the image frames captured by the plurality of cameras, by using object detection by the object detection sensor 222 that performs object sensing with respect to a large region more frequently than the camera 228.

FIG. 1 illustrates an embodiment, and embodiments of the present disclosure are not limited thereto.

Figure 2:
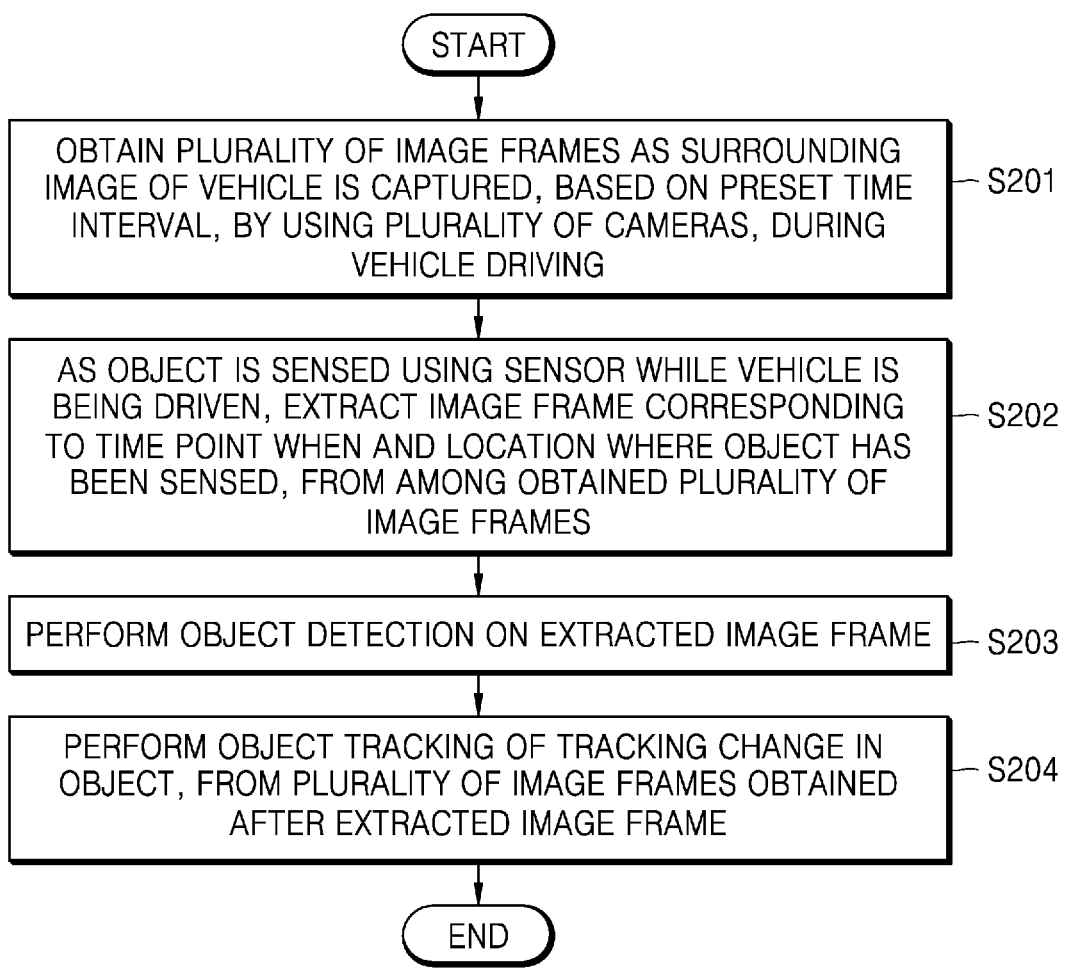
FIG. 2 is a flowchart of an example of performing object detection according to object sensing by a sensor.
Figure 3:
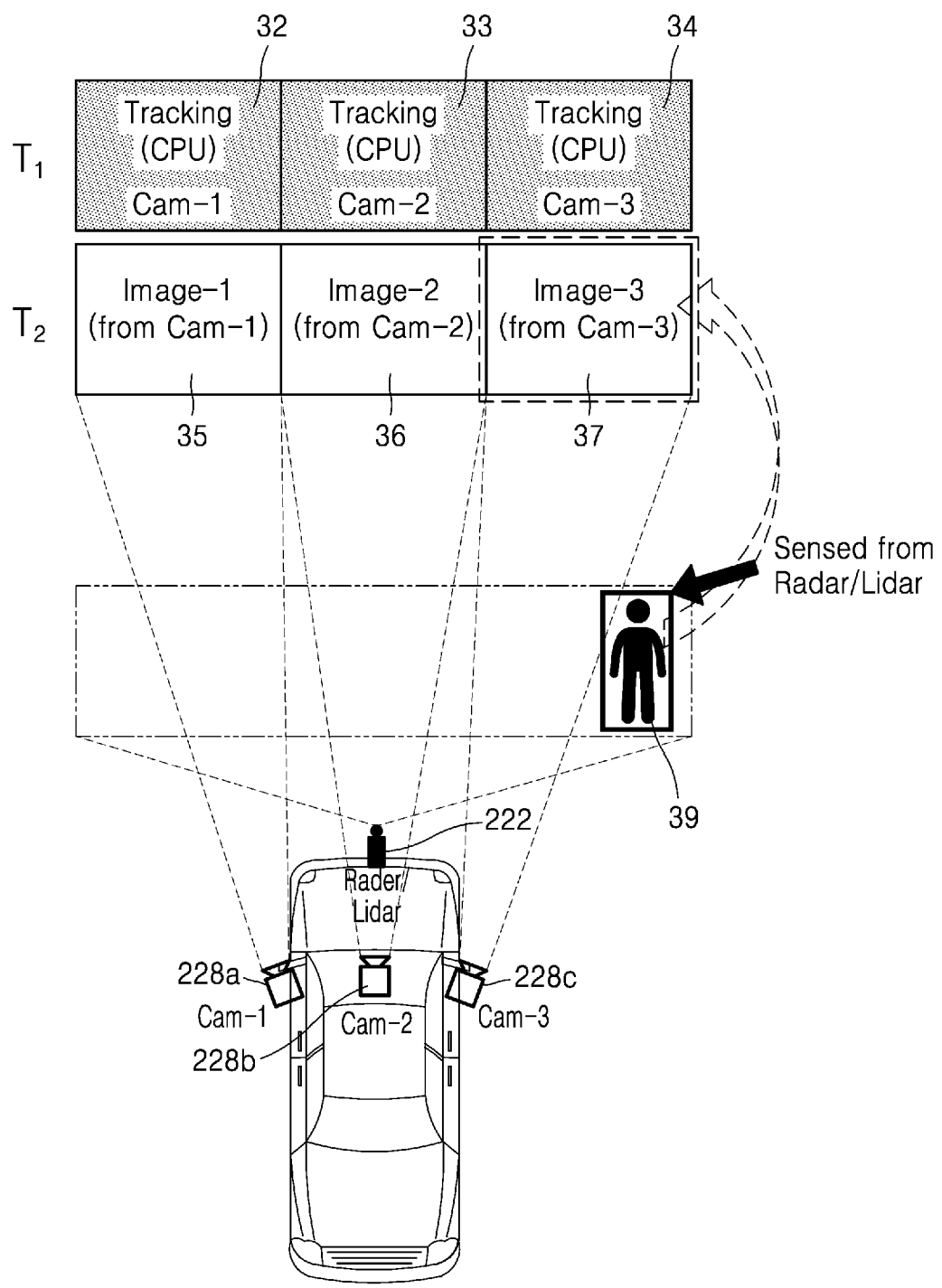
FIGS. 3 through 5 are diagrams for explaining an example of performing object detection according to object sensing by a sensor.
Figure 4:
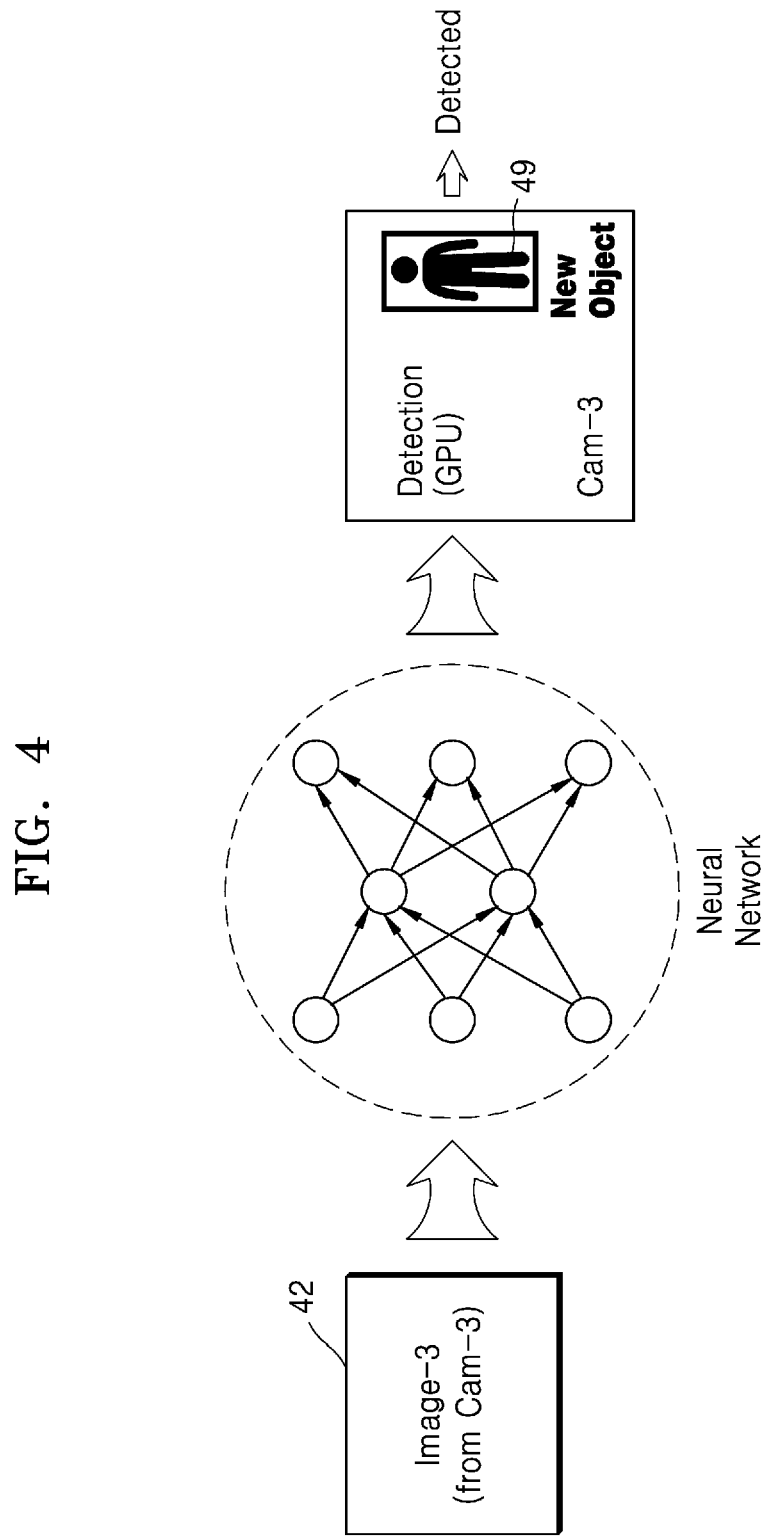
Figure 5:
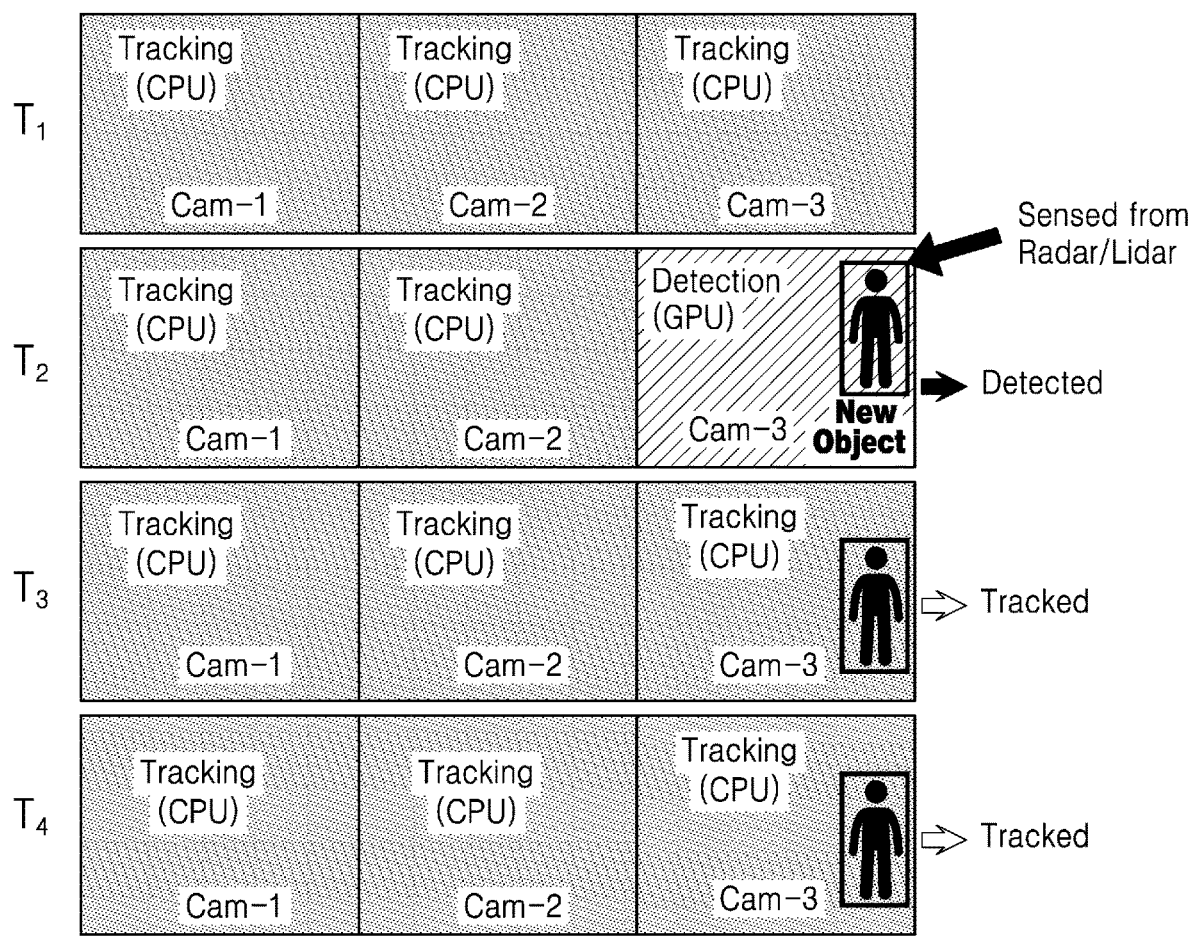

FIG. 2 is a flowchart of an example of performing object detection according to object sensing by a sensor. FIGS. 3 through 5 are diagrams for explaining an example of performing object detection according to object sensing by a sensor. The flowchart of FIG. 2 will now be described with reference to FIGS. 3 through 5.

In operation S201 of FIG. 2, the electronic device 100 may obtain a plurality of image frames as a surrounding image of a vehicle is captured, based on a preset time interval, by using a plurality of cameras, while the vehicle is driving.

According to an embodiment, the electronic device 100 may obtain an image frame at intervals of a preset time (e.g., about 33 ms) by using the plurality of cameras 228 mounted on the vehicle 1 to photograph different directions (front side, rear side, lateral side, and the like).

For example, referring to FIG. 3, the plurality of image frames may include a first image frame 32 obtained using the first camera 228a, a second image frame 33 obtained using the second camera 228b, and a third image frame 34 obtained using the third camera 228c, at a T1 time point. At a T2 time, the plurality of image frames may include a first image frame 35 obtained using the first camera 228a, a second image frame 36 obtained using the second camera 228b, and a third image frame 37 obtained using the third camera 228c.

In operation S202 of FIG. 2, as an object is sensed using a sensor while the vehicle is driving, the electronic device 100 may extract an image frame corresponding to a time point when and a location where the object has been sensed, from among the obtained plurality of image frames.

Referring to FIG. 3, while the vehicle 1 is driving, the electronic device 100 may sense the surroundings of the vehicle 1 by using the object detection sensor 222. For example, the electronic device 100 may sense a pedestrian 39 on the driving path, by using the object detection sensor 222.

According to an embodiment, the electronic device 100 may extract an image frame corresponding to a time point when and a location where the pedestrian 39 has been sensed, namely, an image frame that is estimated to include the sensed pedestrian 39, from among the plurality of image frames obtained using the plurality of cameras. For example, referring to FIG. 3, at the T2 time, the third image frame 37 obtained using the third camera 228c may be extracted.

According to an embodiment, because a sensing frequency at which the object detection sensor 222 senses an object per, for example, one second, is higher than a frequency at which the camera 228 captures an image frame per one second, an image frame captured by the camera 228 at a time point that is close to the time point when the object has been sensed by the object detection sensor 222 may be extracted. According to an embodiment, the extracted image frame may be an image frame captured by the camera 228 at the time point when the object detection sensor 222 has sensed an object, or at a time point that is closest within a predetermined range right after or right before the time point when the object detection sensor 222 has sensed the object.

According to an embodiment, because a region capable of being sensed by the object detection sensor 222 includes photographing regions of the plurality of cameras 228 provided to photograph different directions, an image frame of a camera provided to photograph a region close to the location of the object sensed by the object detection sensor 222 from among the plurality of cameras may be extracted.

In operation S203 of FIG. 2, the electronic device 100 may perform object detection on the extracted image frame. Referring to FIG. 4, the electronic device 100 may detect an object (e.g., a pedestrian 49) included in an extracted image frame 42, by performing predetermined image processing with respect to the extracted image frame 42.

According to an embodiment, the electronic device 100 may perform object detection by using a data recognition model based on a neural network.

According to an embodiment, the electronic device 100 may use a deep neural network that holds two or more layers. Each of the layers may receive data, and may generate output data by processing input data.

According to an embodiment, the electronic device 100 may use a convolutional neural network (CNN) that holds a plurality of layers. The CNN may be used to extract features such as an outline, a line, and a color from complex input data (input image).

In operation S204 of FIG. 2, the electronic device 100 may perform object tracking of tracking a change in an object, from a plurality of image frames obtained after the extracted image frame.

Referring to FIG. 5, for example, when the electronic device 100 detects an object 59 from an image frame 52 obtained using the third camera at a $T_2$ time point, the electronic device 100 may perform object tracking for tracking a change in the object 59, with respect to image frames 59 and 60 obtained at $T_3$ and $T_4$ time points after the $T_2$ time point.

According to an embodiment, when a new object is sensed by the object detection sensor 222 while object tracking capable of being performed by a CPU is continuing on the plurality of image frames obtained via the plurality of cameras 228, the electronic device 100 may perform object detection capable of being performed by a GPU, with respect to an image frame that is estimated to include the new object. The electronic device 100 may continue object tracking for tracking a change in an object detected from an image frame that is obtained later.

Accordingly, the electronic device 100 may perform highly-efficient object detection that brings a highly-accurate object detection result while minimally utilizing object detection that requires many calculations.

FIGS. 3 through 5 illustrate an embodiment, and thus embodiments of the present disclosure are not limited thereto.

Figure 6:
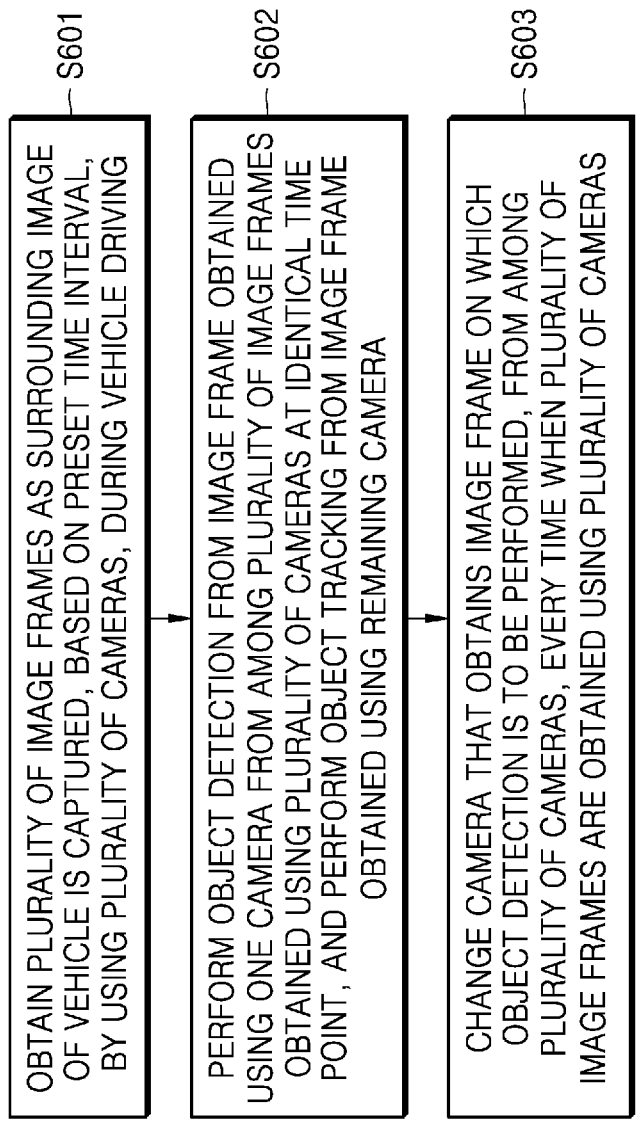
FIG. 6 is a flowchart of an example of performing object detection according to a preset cycle.
Figure 7:
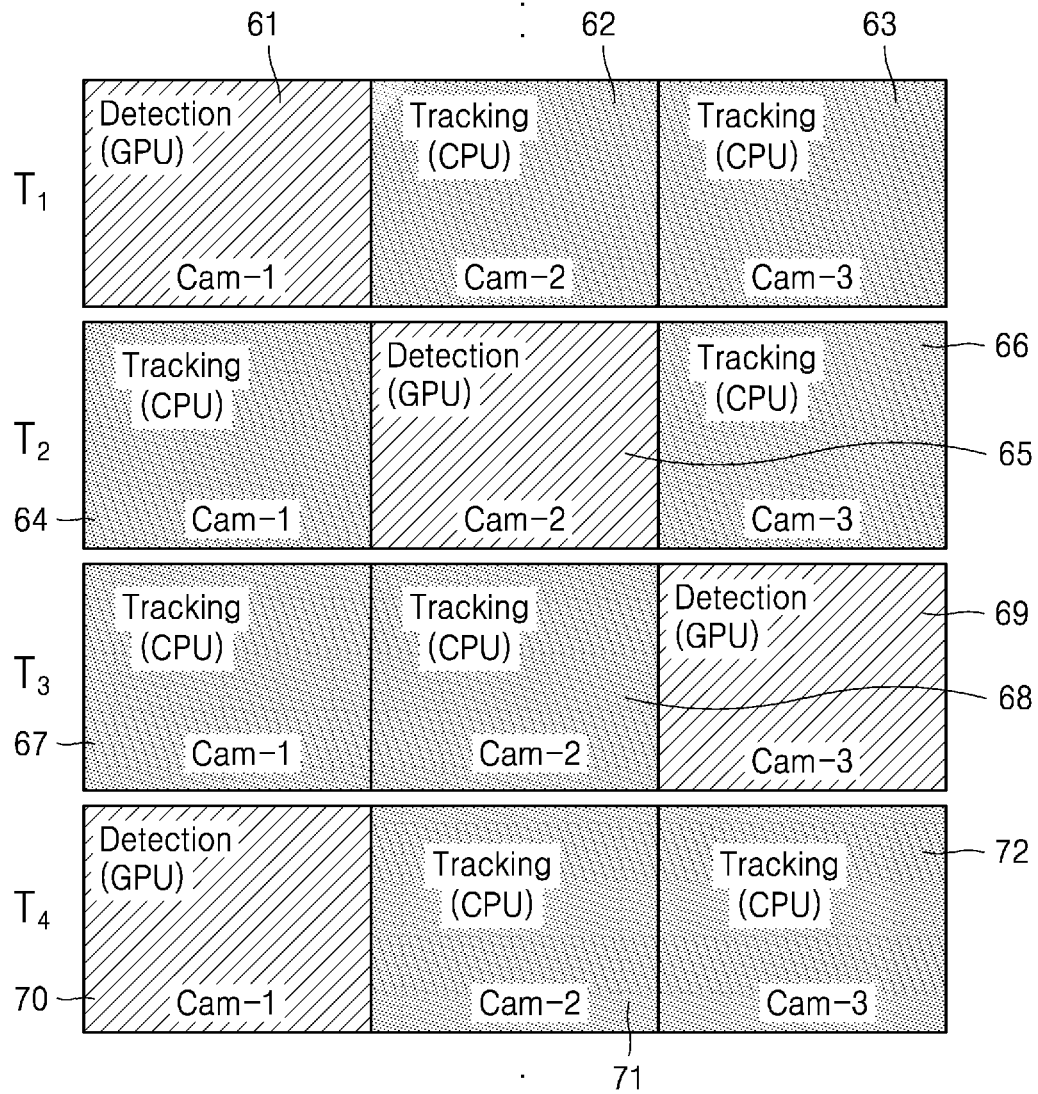
FIGS. 7 and 8 are diagrams for explaining an example of performing object detection according to a preset cycle.
Figure 8:
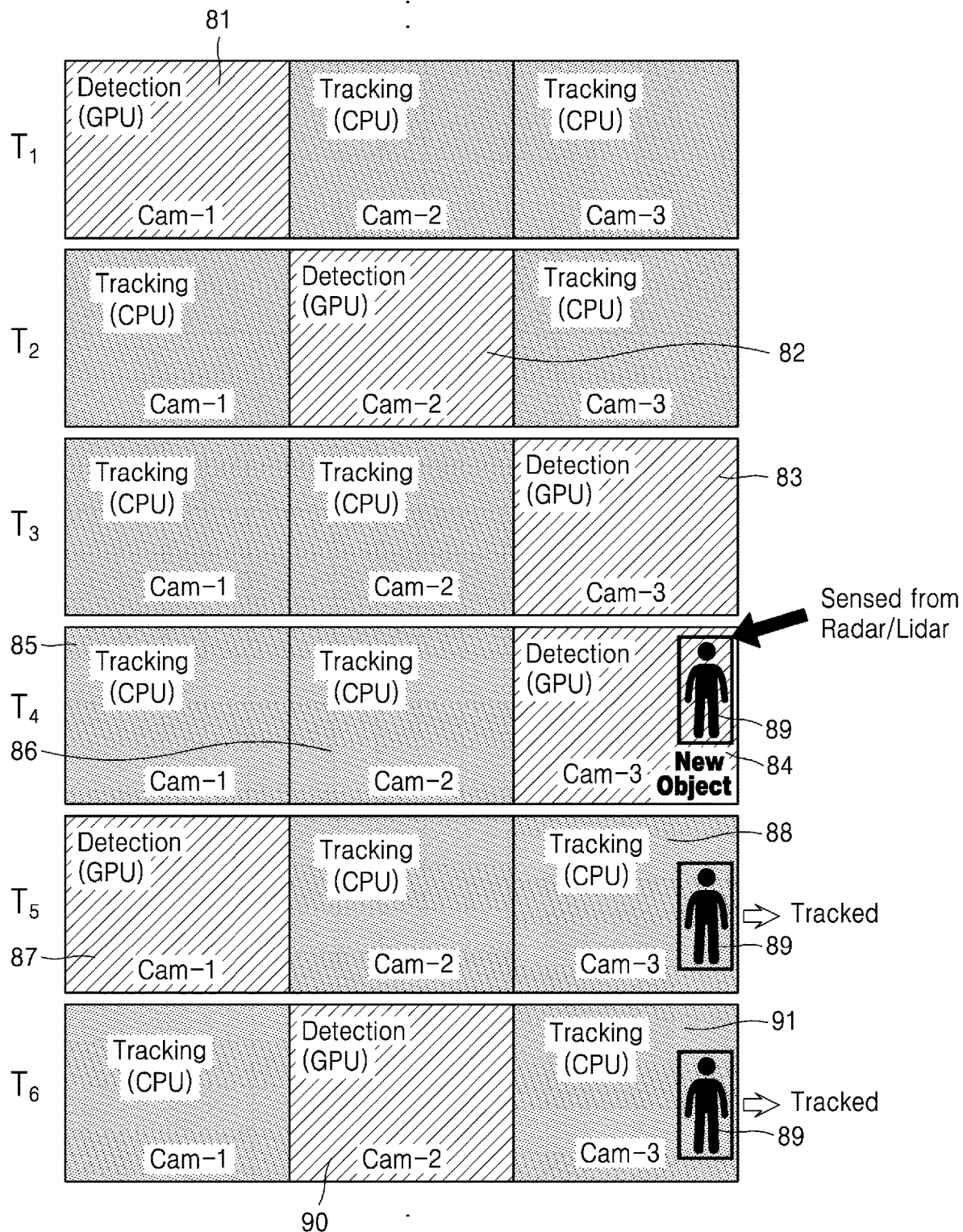

FIG. 6 is a flowchart of an example of performing object detection according to a preset cycle. FIGS. 7 and 8 are diagrams for explaining an example of performing object detection according to a preset cycle. The flowchart of FIG. 6 will now be described with reference to FIGS. 7 and 8.

According to an embodiment, the electronic device 100 may perform object detection for detecting an object included in each of a plurality of image frames obtained using a plurality of cameras or object tracking for tracking a change in an object included in each of the plurality of image frames, with respect to each of the plurality of image frames, based on the preset cycle.

FIGS. 6 through 8 illustrate an example of selectively performing object detection on an image frame obtained using one camera from among a plurality of image frames obtained at an identical time point.

In operation S601 of FIG. 6, the electronic device 100 may obtain a plurality of image frames as a surrounding image of a vehicle is captured based on a preset time interval by using a plurality of cameras, while the vehicle is driving.

Operation S601 is the same as operation S201 of FIG. 2 described above, and thus a detailed description thereof will be omitted.

In operation S602 of FIG. 6, the electronic device 100 may perform object detection from an image frame obtained using one camera from among the plurality of image frames obtained using the plurality of cameras at an identical time point, and may perform object tracking from an image frame obtained using a remaining camera.

In operation S603 of FIG. 6, the electronic device 100 may change a camera that obtains an image frame on which object detection is to be performed, from among the plurality of cameras, every time when the plurality of image frames are obtained using the plurality of cameras.

Referring to FIG. 7, for example, the electronic device 100 may perform object detection on an image frame 61 obtained using a first camera from among a plurality of image frames 61, 62, and 63 obtained at a $T_1$ time point, and may perform object tracking on the image frames 62 and 63 obtained using remaining cameras.

For example, the electronic device 100 may perform object detection on an image frame 65 obtained using a second camera from among a plurality of image frames 64, 65, and 66 obtained at a $T_2$ time point, and may perform object tracking on the image frames 64 and 66 obtained using remaining cameras.

For example, the electronic device 100 may perform object detection on an image frame 69 obtained using a third camera from among a plurality of image frames 67, 68, and 69 obtained at a $T_3$ time point, and may perform object tracking on the image frames 67 and 68 obtained using remaining cameras.

For example, the electronic device 100 may perform object detection on an image frame 70 obtained using a first camera from among a plurality of image frames 70, 71, and 72 obtained at a $T_4$ time point, and may perform object tracking on the image frames 71 and 72 obtained using remaining cameras.

As shown in FIG. 7, the electronic device 100 may change a camera that obtains an image frame on which object detection is to be performed, from among the plurality of cameras, at each time point (e.g., $T_1$, $T_2$, $T_3$, or $T_4$) when the plurality of image frames are obtained using the plurality of cameras. For example, the electronic device 100 may perform object detection from image frames respectively obtained using a first camera at the $T_1$ time point, using a second camera at the $T_2$ time point, using a third camera at the $T_3$ time point, and using the first camera at the $T_4$ time point.

According to an embodiment, the electronic device 100 may change the camera that obtains the image frame on which object detection is to be performed, sequentially (e.g., in the order from the first camera to the third camera through the second camera), but embodiments of the present disclosure are not limited thereto.

Referring to FIG. 8, the electronic device 100 may perform object detection on, for example, an image frame 81 obtained using the first camera at a $T_1$ time point, an image frame 82 obtained using the second camera at a $T_2$ time point, and an image frame 83 obtained using the third camera at a $T_3$ time point, while sequentially changing a camera that obtains an image frame on which object detection is to be performed.

The electronic device 100 may sense the surroundings of the vehicle 1 by using the object detection sensor 222 while the vehicle 1 is driving, and may sense a new object 89.

As an event of sensing the object 89 by using the object detection sensor 222 occurs, the electronic device 100 may perform object detection on an image frame 84 corresponding to a location of the object 89 from among a plurality of image frames obtained at a $T_4$ time point that is close to a time point when the object 89 is sensed.

According to an embodiment, as the electronic device 100 performs object detection that requires many calculations and is performed by a GPU, on the image frame 84 obtained by the third camera, the electronic device 100 may perform object tracking with respect to image frames 85 and 86 obtained using remaining cameras.

According to an embodiment, the electronic device 100 may perform object tracking for tracking a change in the detected object 89, with respect to image frames 88 and 91 obtained using the third camera at $T_5$ and $T_6$ time points.

According to an embodiment, the electronic device 100 may perform object detection on an image frame obtained using one camera from among the plurality of image frames obtained using the plurality of cameras and may perform object tracking on an image frame obtained using a remaining camera, thereby continuously performing object detection.

Referring to FIG. 8, the electronic device 100 may sequentially perform object detection on an image frame 87 obtained using the first camera at the $T_5$ time point and an image frame 90 obtained using the second camera at the $T_6$ time point, while sequentially changing the camera that obtains the image frame on which object detection is to be performed.

FIGS. 6 through 8 illustrate an embodiment, and thus embodiments of the present disclosure are not limited thereto.

Figure 9:
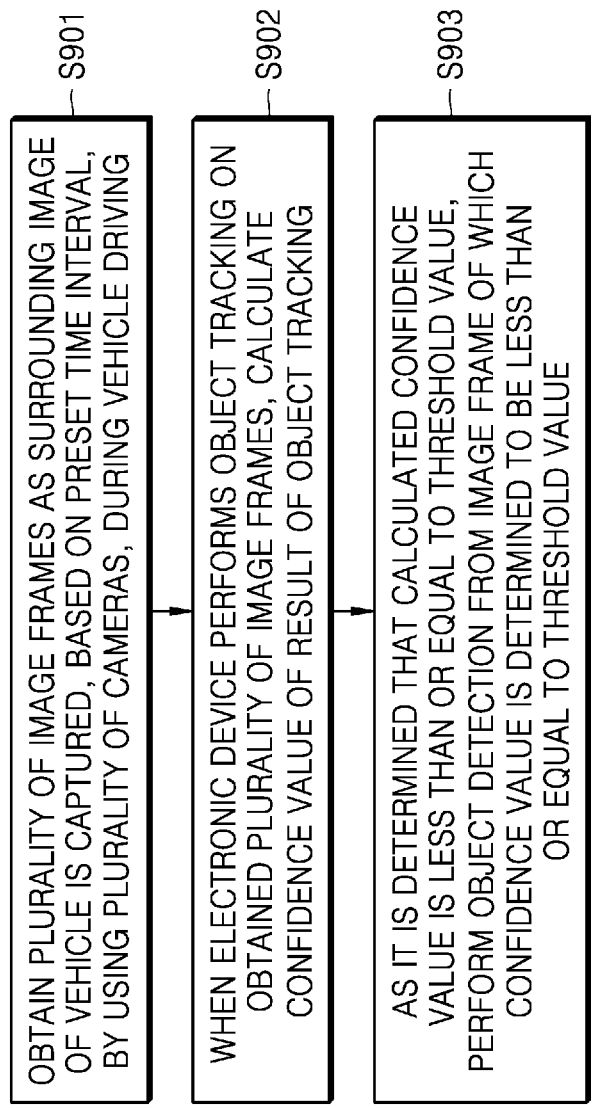
FIG. 9 is a flowchart of an example of performing object detection according to the confidence of object tracking.
Figure 10:
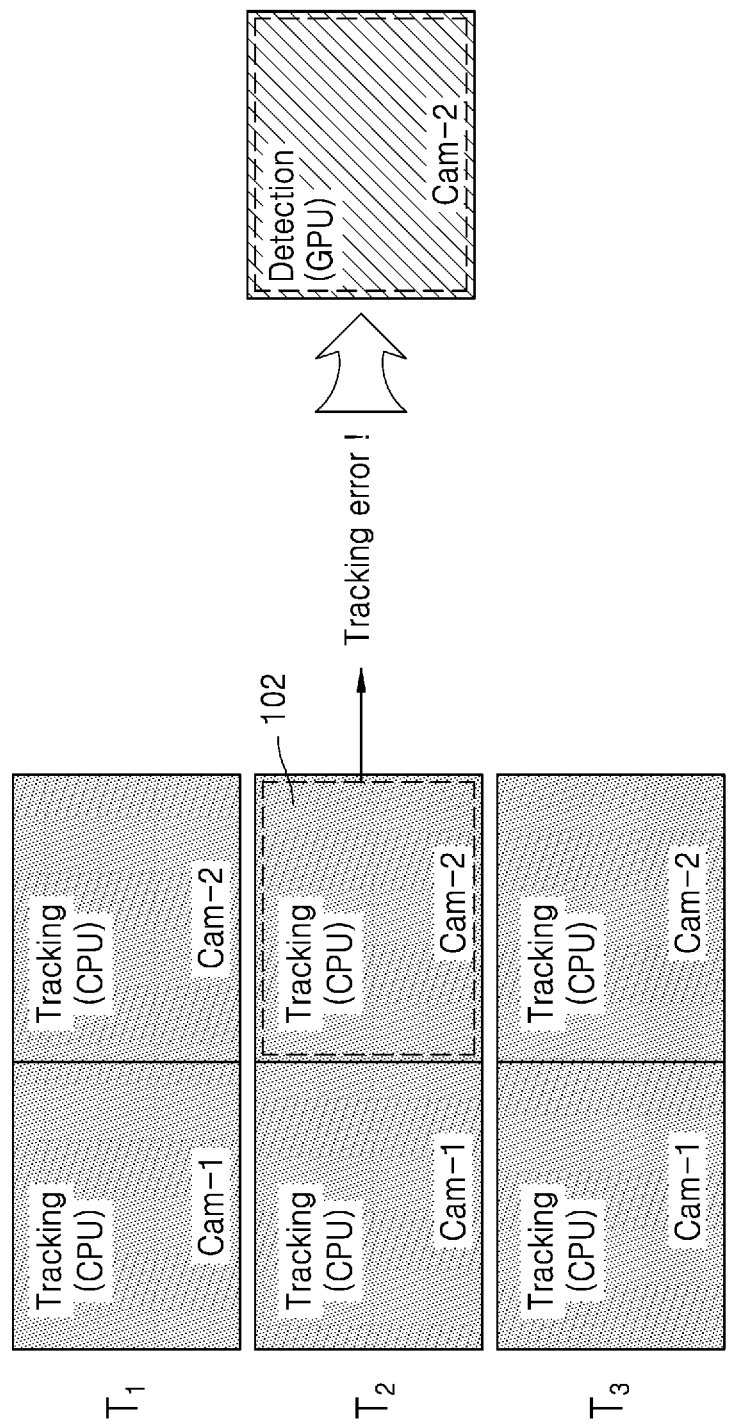
FIG. 10 is a diagram for explaining an example of performing object detection according to the confidence of object tracking.

FIG. 9 is a flowchart of an example of performing object detection according to the confidence of object tracking. FIG. 10 is a diagram for explaining an example of performing object detection according to the confidence of object tracking. The flowchart of FIG. 9 will now be described with reference to FIG. 10.

According to an embodiment, the electronic device 100 may perform object detection for detecting an object included in each of a plurality of image frames obtained using a plurality of cameras or object tracking for tracking a change in an object included in each of the plurality of image frames, with respect to each of the plurality of image frames, based on the preset cycle.

FIGS. 9 and 10 illustrate an example of selectively performing object detection, based on the confidence of object tracking.

In operation S901 of FIG. 9, the electronic device 100 may obtain a plurality of image frames as a surrounding image of a vehicle is captured based on a preset time interval by using a plurality of cameras while the vehicle is driving.

Operation S901 is the same as operation S201 of FIG. 2 described above, and thus a detailed description thereof will be omitted.

In operation S902 of FIG. 9, when the electronic device 100 performs object tracking on the obtained plurality of image frames, the electronic device 100 may calculate a confidence value of a result of the object tracking.

According to an embodiment, when the electronic device 100 performs object tracking with respect to a series of image frames, the electronic device 100 may calculate a confidence value of a result of the object tracking, based on a predicted change in an object that is tracked after object detection. For example, the electronic device 100 may calculate the confidence value of the result of the object tracking, based on a change in an object that is predicted according to a surrounding environment such as the type of an object, the color of the object, motion information of the object, the driving speed of a vehicle, an acceleration, information about the lane on the driving path, and a road situation.

In operation S903 of FIG. 9, as it is determined that the calculated confidence value is less than or equal to a threshold value, the electronic device 100 may perform object detection from an image frame of which the confidence value is determined to be less than or equal to the threshold value.

According to an embodiment, when the confidence value of the result of the object tracking is less than or equal to the threshold value, the electronic device 100 may determine that an tracking error has occurred in object tracking.

Referring to FIG. 10, when it is determined that an tracking error has occurred in an image frame 102, the electronic device 100 may perform object detection on the image frame 102, in order to increase the accuracy of image pressing for object detection and object tracking.

FIGS. 9 and 10 illustrate an embodiment, and thus the present disclosure is not limited thereto.

Figure 11:
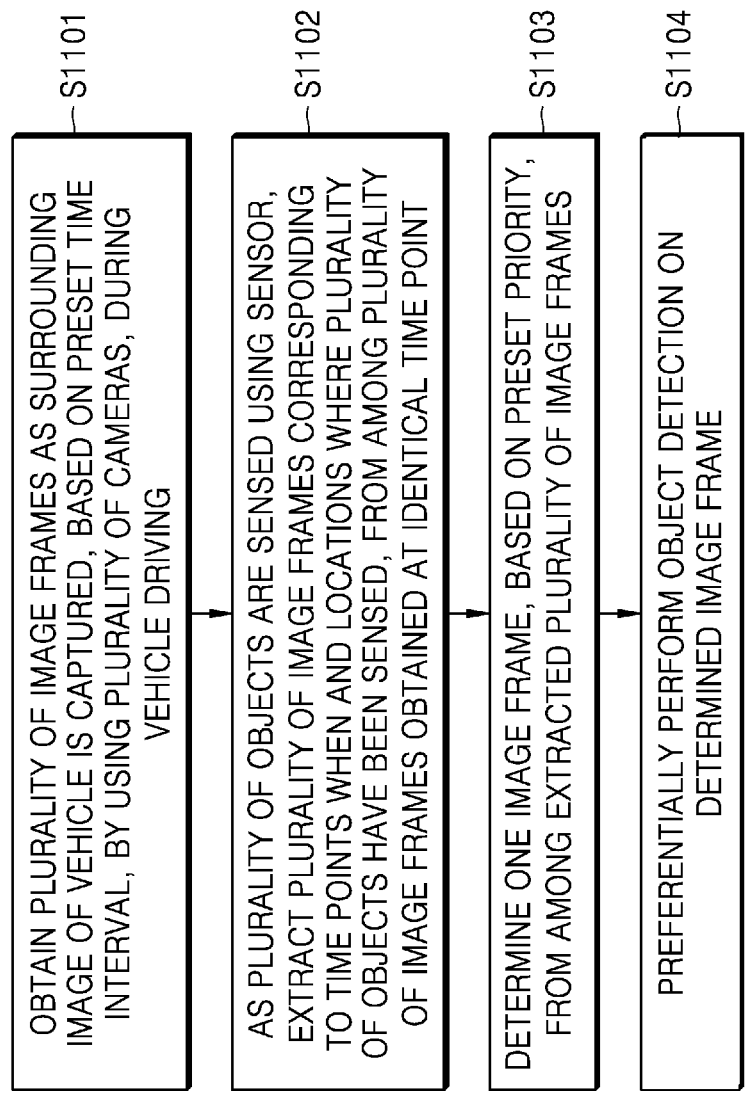
FIG. 11 is a flowchart of an example of performing object detection according to a preset priority.
Figure 12:
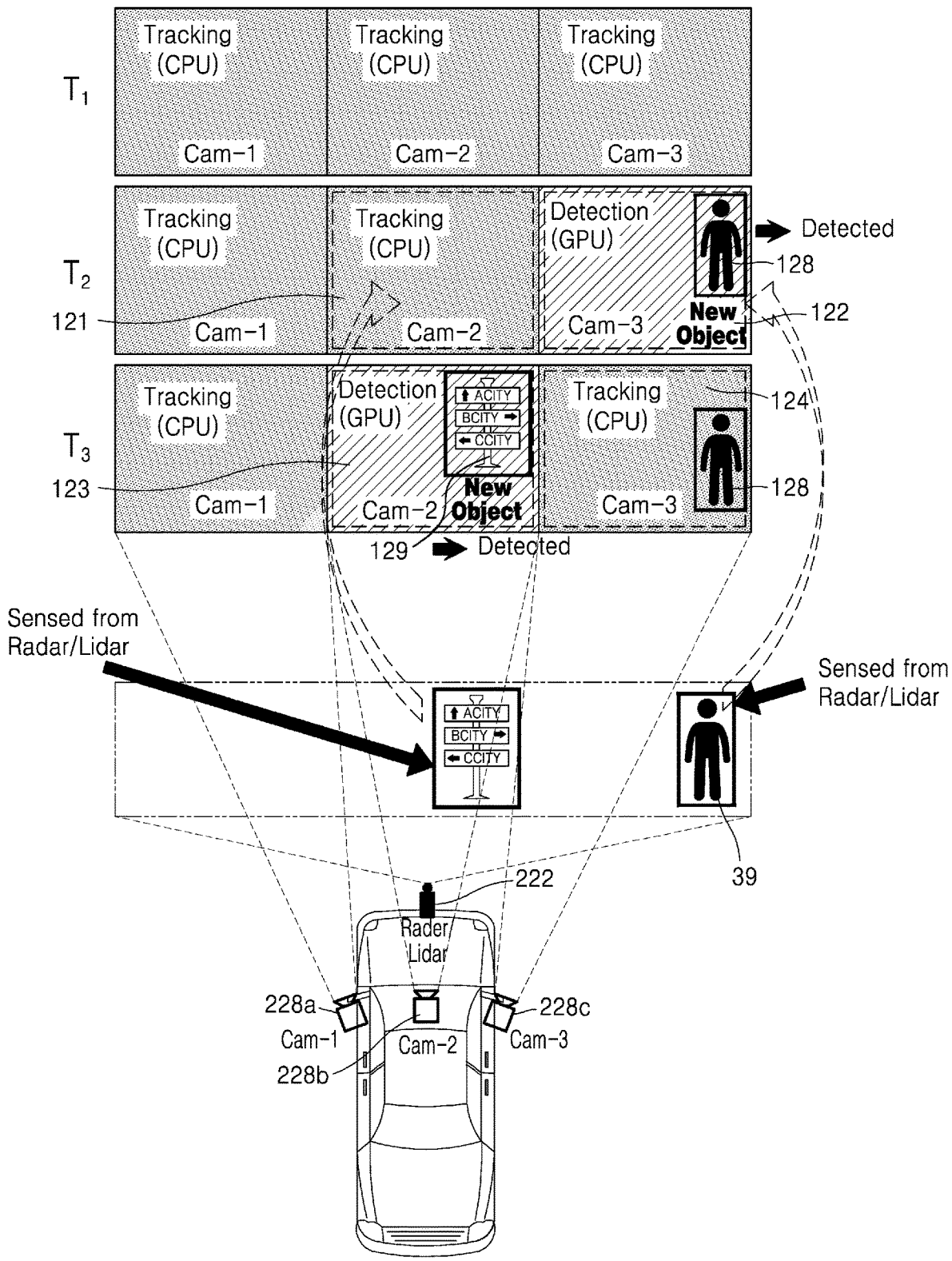
FIG. 12 is a diagram for explaining an example of performing object detection according to a preset priority.

FIG. 11 is a flowchart of an example of performing object detection according to a preset priority. FIG. 12 is a diagram for explaining an example of performing object detection according to a preset priority. The flowchart of FIG. 11 will now be described with reference to FIG. 12.

In operation S1101 of FIG. 11, the electronic device 100 may obtain a plurality of image frames as a surrounding image of a vehicle is captured based on a preset time interval by using a plurality of cameras while the vehicle is driving.

Operation S1101 is the same as operation 5201 of FIG. 2 described above, and thus a detailed description thereof will be omitted.

In operation S1102 of FIG. 11, as a plurality of objects are sensed using a sensor, the electronic device 100 may extract a plurality of image frames corresponding to time points when and locations where the plurality of objects have been sensed, from among a plurality of image frames obtained at an identical time point.

Referring to FIG. 12, for example, the electronic device 100 may detect a pedestrian 128 and a road sign 129 at an identical time point by using the object detection sensor 222. As the electronic device 100 senses the pedestrian 128 and the road sign 129 by using the object detection sensor 222, the electronic device 100 may extract an image frame corresponding to a time point when and a location where each of the pedestrian 128 and the road sign 129 has been sensed, from among the plurality of image frames obtained using the camera 228. For example, the electronic device 100 may extract a plurality of image frames 121 and 122 obtained via different cameras at an identical time point ($T_2$).

In operation S1103 of FIG. 11, the electronic device 100 may determine one image frame, based on the preset priority, from among the extracted plurality of image frames.

According to an embodiment, when a plurality of image frames captured at an identical time point are extracted, the electronic device 100 may determine one image frame, based on the preset priority.

According to an embodiment, the electronic device 100 may set a priority according to the type of an object. For example, the electronic device 100 may set a pedestrian as a highest priority. According to an embodiment, the electronic device 100 may set the priority according to the distance of an object. For example, the electronic device 100 may set a higher priority for an object of which a distance from the vehicle 1 is determined to be closer, and embodiments of the present disclosure are not limited thereto.

Referring to FIG. 12, for example, the electronic device 100 may preferentially select the pedestrian 129 according to the type of an object. As the pedestrian 129 is determined to be closer to the vehicle 1 than the road sign 129 is, the electronic device 100 may select the pedestrian 129.

According to an embodiment, the electronic device 100 may determine the image frame 122 that is estimated to include the pedestrian 129, according to the priority, from among the extracted plurality of image frames 121 and 122.

In operation S1104 of FIG. 11, the electronic device 100 may preferentially perform object detection on the determined image frame.

According to an embodiment, the electronic device 100 may preferentially perform object detection on the image frame 122 that is estimated to include the pedestrian 129, from among the plurality of image frames 121 and 122 obtained at the $T_2$ time point close to the time point when the pedestrian 128 and the road sign 129 have been sensed.

The electronic device 100 may detect the road sign 129 by performing object detection with respect to an image frame 123 of a T3 time point that is next to the T2 time point close to the time point when the pedestrian 128 has been sensed by the object detection sensor 222.

The electronic device 100 may perform object tracking on an image frame 124 of the T3 time point in order to track a change in the detected pedestrian 128.

According to an embodiment, when a plurality of objects are sensed at an identical time point by using the object detection sensor 222, object detection may be preferentially performed with respect to an image frame corresponding to an object having a high priority, and object detection may be then performed with respect to an image frame corresponding to an object having a second high priority. Accordingly, even within restricted resources of an embedded system, object detection that requires many calculations may be efficiently performed, and object detection delay with respect to an object having a high ranking in terms of the importance of object detection may be prevented.

FIGS. 11 and 12 illustrate an embodiment, and thus the present disclosure is not limited thereto.

Figure 13:
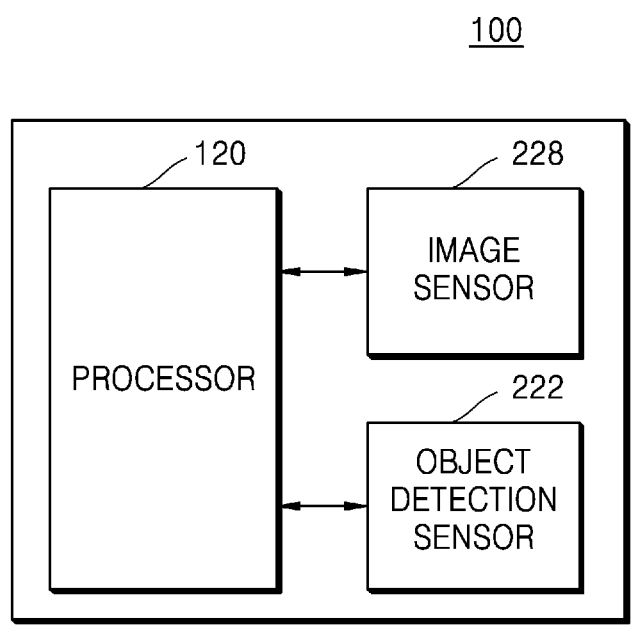
FIG. 13 is a block diagram of an electronic device according to an embodiment.

FIG. 13 is a block diagram of an electronic device according to an embodiment.

According to an embodiment, the electronic device 100 may include the image sensor 228, the object detection sensor 222, and a processor 120. Only components related with the present embodiment from among the components of the electronic device 100 are shown in FIG. 13. It will be understood by one of ordinary skill in the art related with the present embodiment that general-use components other than the components illustrated in FIG. 13 may be further included.

According to an embodiment, the image sensor 228 may include a plurality of cameras. The image sensor 228 may photograph the surroundings of the vehicle 1 while the vehicle 1 is driving.

According to an embodiment, the object detection sensor 222 may include the RADAR sensor 226 of FIG. 14 and the LIDAR sensor 227 of FIG. 14. The object detection sensor 222 may sense objects from the surroundings of the vehicle 1 while the vehicle 1 is driving.

According to an embodiment, a sensing unit 110 of FIG. 14 may include one or more actuator configured to change locations and/or orientations of a plurality of sensors, and thus may sense objects located in front, rear, and side directions of the vehicle 1.

According to an embodiment, the processor 120 may include at least one processor.

According to an embodiment, the processor 120 may obtain a plurality of image frames as a surrounding image of the vehicle 1 is captured based on a preset time interval by using the plurality of cameras 228 while the vehicle 1 is driving.

As an object is sensed using the object detection sensor 222 while the vehicle 1 is driving, the processor 120 may extract an image frame corresponding to a time point when and a location where the object has been sensed, from among the obtained plurality of image frames.

The processor 120 may perform object detection for detecting an object from the extracted image frame, by using a data recognition model based on a neural network.

The processor 120 may perform object tracking of tracking a change in the detected object, from a plurality of image frames obtained after the extracted image frame.

The processor 120 may perform object detection for detecting an object included in each of a plurality of image frames obtained using the plurality of cameras 228 or object tracking for tracking a change in an object included in each of the plurality of image frames, with respect to each of the plurality of image frames, based on the preset cycle.

The processor 120 may perform object tracking on the plurality of image frames obtained using the plurality of cameras, until the object is detected using the object detection sensor 228.

The processor 120 may perform object detection on an image frame obtained using one camera from among the plurality of image frames obtained using the plurality of cameras 228 at an identical time point, and may perform object tracking on an image frame obtained using a remaining camera.

The processor 120 may change a camera that obtains an image frame on which object detection is to be performed, from among the plurality of cameras, every time when the plurality of image frames are obtained using the plurality of cameras.

The plurality of cameras 228 may include first and second cameras, and the processor 120 may perform object detection on an image frame obtained using the first camera at a first time point, and may perform object detection on an image frame obtained using the second camera at a second time point that is after a preset time interval from the first time point.

The processor 120 may perform object tracking on an image frame obtained using the first camera at the second time point.

When the processor 120 performs object tracking on the obtained image frame, the processor 120 may calculate a confidence value of a result of the object tracking. As it is determined that the calculated confidence value is less than or equal to a threshold value, the processor 120 may perform object detection from an image frame of which the confidence value is determined to be less than or equal to the threshold value.

As a plurality of objects are sensed using the object detection sensor 222, the processor 120 may extract a plurality of image frames corresponding to time points when and locations where the plurality of objects have been sensed, from among a plurality of image frames obtained at an identical time point. The processor 120 may determine one image frame, based on the preset priority, from among the extracted plurality of image frames. The processor 120 may preferentially perform object detection on the determined image frame.

The processor 120 may include a GPU, and object detection may be performed by the GPU.

FIG. 14 is a detailed block diagram of an electronic device according to an embodiment.

Referring to FIG. 14, the electronic device 100 may further include the sensing unit 110 including a plurality of sensors, an output interface 130, a storage 140, an input interface 150, and a communication interface 160, in addition to the object detection sensor 222, the image sensor 228, and the processor 120. It will be understood by one of ordinary skill in the art related with the present embodiment that general-use components other than the components illustrated in FIG. 14 may be further included.

According to an embodiment, the sensing unit 110 may include a plurality of sensors configured to sense information about a surrounding environment of the vehicle 1, and may include one or more actuators configured to correct locations and/or orientations of the sensors. For example, the sensing unit 110 may include a global positioning system (GPS) 224, an inertial measurement unit (IMU) 225, the RADAR sensor 226, the LIDAR sensor 227, the image sensor 228, and an odometry sensor 230. The sensing unit 110 may include at least one of a temperature/humidity sensor 232, an infrared sensor 233, an atmospheric pressure sensor 235, a proximity sensor 236, and an RGB sensor 237 (e.g., an illuminance sensor), but embodiments are not limited thereto. Functions of most of the sensors would be instinctively understood by one of ordinary skill in the art in view of their names and thus detailed descriptions thereof will be omitted herein.

The sensing unit 110 may also include a motion sensing unit 238 configured to sense a movement of the vehicle 1. The motion sensing unit 238 may include a magnetic sensor 229, an acceleration sensor 231, and a gyroscope sensor 234.

The GPS 224 may be a sensor configured to estimate a geographical position of the vehicle 1. In other words, the GPS 224 may include a transceiver configured to estimate a position of the vehicle 1 with respect to the earth.

The IMU 225 may be a combination of sensors configured to sense position and orientation variations of the vehicle 1, based on inertial acceleration. For example, the combination of sensors may include accelerometers and gyroscopes.

The RADAR sensor 226 may be a sensor configured to sense objects within an environment where the vehicle 1 is located, by using a wireless signal. The RADAR sensor 226 may also be configured to sense speeds and/or directions of objects.

The LIDAR sensor 227 may be a sensor configured to sense the objects within the environment where the vehicle 1 is located, by using laser. In more detail, the LIDAR sensor 227 may include a laser light source and/or laser scanner configured to emit laser, and a detector configured to detect reflection of the laser. The LIDAR sensor 227 may be configured to operate in a coherent detection mode (e.g., heterodyne detection is used) or an incoherent detection mode.

The image sensor 228 may be a still camera or video camera configured to record an external environment of the vehicle 1. For example, the image sensor 228 may include a plurality of cameras, and the plurality of cameras may be arranged at a plurality of locations inside or outside the vehicle 1.

The odometry sensor 230 may estimate a location of the vehicle 1 and measure a distance by which the vehicle 1 moves. For example, the odometry sensor 230 may measure a location variation of the vehicle 1 by using the number of revolutions of a wheel of the vehicle 1.

The storage 140 may be a magnetic disk drive, an optical disk drive, or flash memory. Alternatively, the storage 140 may be a portable universal serial bus (USB) data storage device. The storage 140 may store system software for executing examples related with the present application. The system software for executing examples related with the present application may be stored in a portable storage medium.

The communication interface 160 may include at least one antenna for communicating with another device in a wireless manner. For example, the communication interface 160 may be used to communicate with a cellular network or another radio protocol and system in a wireless manner via Wi-Fi or Bluetooth. The communication interface 160 controlled by the processor 120 may transmit and receive radio signals. For example, the processor 120 may execute a program included in the storage 140, to allow the communication interface 160 to transmit and receive radio signals to and from the cellular network.

The input interface 150 refers to a means via which data for controlling the vehicle 1 is input. For example, the input interface 150 may be, but is not limited to, a key pad, a dome switch, a touch pad (e.g., a capacitive overlay type, a resistive overlay type, an infrared beam type, an integral strain gauge type, a surface acoustic wave type, a piezo electric type, or the like), a jog wheel, or a jog switch. The input interface 150 may include a microphone, and accordingly the microphone may be configured to receive an audio (for example, an audio command) from a driver or a passenger of the vehicle 1.

The output interface 130 may output audio signals or video signals, and may include a display 281 and an audio output interface 282.

The display 281 may include at least one of a liquid crystal display (LCD), a thin film transistor-LCD (TFT-LCD), an organic light-emitting diode (OLED), a flexible display, a three-dimensional (3D) display, and an electrophoretic display. According to implementation of the output interface 130, the output interface 130 may include two or more displays 281.

The audio output interface 282 outputs audio data that is received from the communication interface 160 or stored in the storage 140. The audio output interface 282 may include, for example, a speaker and a buzzer.

The input interface 150 and the output interface 130 may include network interfaces, and may be implemented using a touch screen.

The processor 120 may control the sensing unit 110, the communication interface 160, the input interface 150, the storage 140, and the output interface 130 by executing the programs stored in the storage 140.

Figure 15:
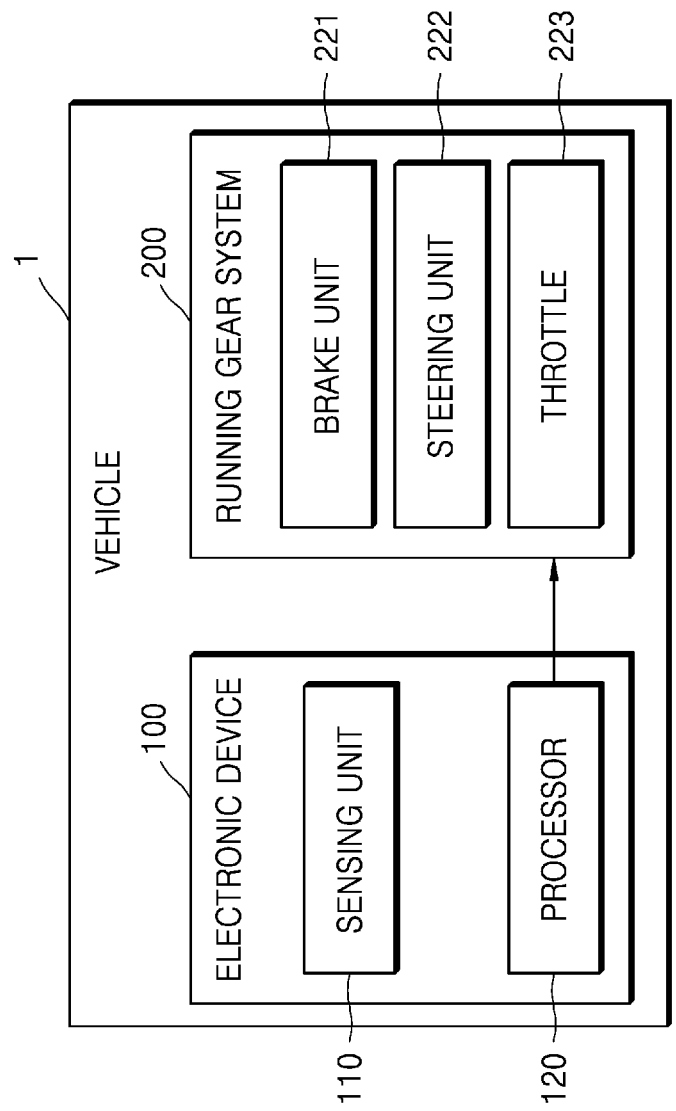
FIG. 15 is a block diagram of a vehicle according to an embodiment.

FIG. 15 is a block diagram of a vehicle according to an embodiment.

According to an embodiment, the vehicle 1 may include the electronic apparatus 100 and a running gear system 200. Only components related with the present embodiment from among the components of the vehicle 1 are shown in FIG. 15. It will be understood by one of ordinary skill in the art related with the present embodiment that general-use components other than the components illustrated in FIG. 15 may be further included.

The electronic device 100 may include the sensing unit 110 and the processor 120. Detailed descriptions of the sensing unit 110 and the processor 120 are provided above in relation to FIGS. 13 and 14, and thus will not be repeated herein.

The running gear system 200 may include a brake unit 221, a steering unit 222, and a throttle 223.

The steering unit 222 may include a combination of mechanisms configured to control a direction of the vehicle 1.

The throttle 223 may include a combination of mechanisms configured to control a speed of the vehicle 1 by controlling a speed of an engine/motor. The throttle 223 may control the amount of a mixture gas of fuel and air supplied into the engine/motor by adjusting opening of the throttle 223, and control power and thrust by adjusting opening of the throttle 223.

The brake unit 221 may include a combination of mechanisms configured to decelerate the vehicle 1. For example, the brake unit 221 may use friction to reduce a speed of wheels/tires.

Figure 16:
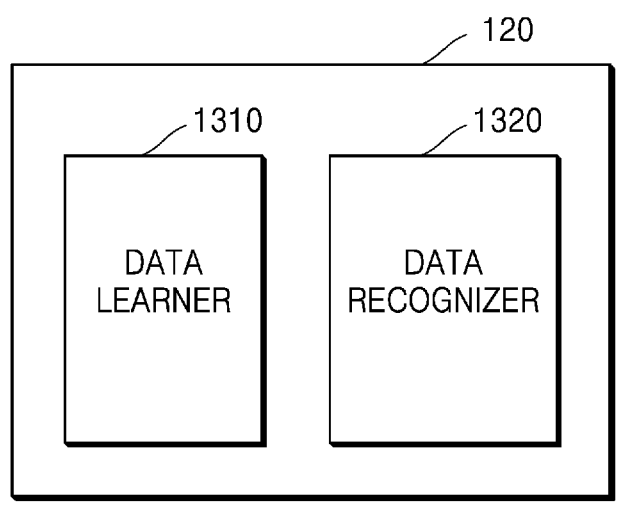
FIG. 16 is a block diagram of a processor according to an embodiment.

FIG. 16 is a block diagram of a processor according to an embodiment.

Referring to FIG. 16, the processor 120 may include a data learner 1310 and a data recognizer 1320.

The data learner 1310 may train a criterion for estimating a situation. The data learner 1310 may train a criterion regarding what data is used to estimate a certain situation and how to estimate a situation by using data. The data learner 1310 may obtain data for use in training and may apply the obtained data to a data recognition model which will be described later, thereby training the criterion for situation estimation.

The data recognizer 1320 may estimate a situation based on data. The data recognizer 1320 may recognize a situation from certain data, by using a trained data recognition model. The data recognizer 1320 may obtain certain data according to a criterion previously set due to training, and use a data recognition model by using the obtained data as an input value, thereby estimating a situation based on the certain data. A result value output by the data recognition model by using the obtained data as an input value may be used to update the data recognition model.

At least one of the data learner 1310 and the data recognizer 1320 may be manufactured in the form of at least one hardware chip and may be mounted on an electronic device. For example, at least one of the data learner 1310 and the data recognizer 1320 may be manufactured in the form of a dedicated hardware chip for artificial intelligence (AI), or may be manufactured as a portion of an existing general-purpose processor (for example, a CPU or an application processor (AP)) or a processor dedicated to graphics (for example, a GPU) and may be mounted on any of the aforementioned various electronic devices.

In this case, the data learner 1310 and the data recognizer 1320 may be both mounted on a single electronic device, or may be respectively mounted on independent electronic devices. For example, one of the data trainer 1310 and the data recognizer 1320 may be included in an electronic device, and the other may be included in a server. The data trainer 1310 and the data recognizer 1320 may be connected to each other by wire or wirelessly, and thus model information established by the data trainer 1310 may be provided to the data recognizer 1320 and data input to the data recognizer 1320 may be provided as additional training data to the data trainer 1310.

At least one of the data learner 1310 and the data recognizer 1320 may be implemented as a software module. When at least one of the data trainer 1310 and the data recognizer 1320 is implemented using a software module (or a program module including instructions), the software module may be stored in non-transitory computer readable media. In this case, the at least one software module may be provided by an operating system (OS) or by a certain application. Alternatively, some of the at least one software module may be provided by an OS and the others may be provided by a certain application.

Figure 17:
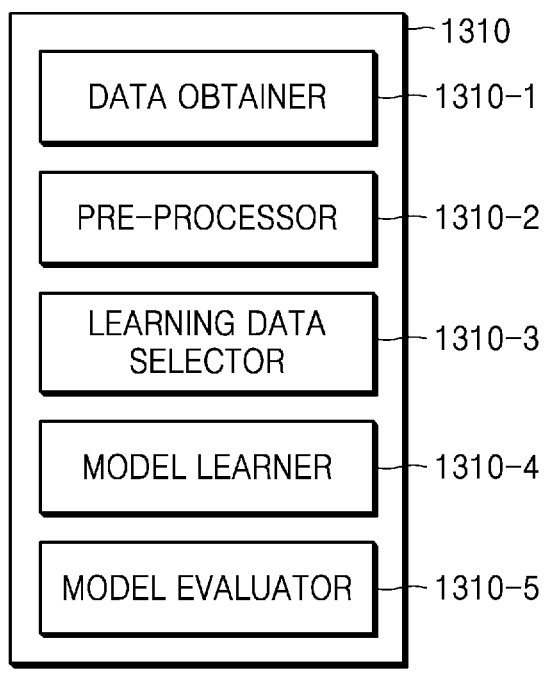
FIG. 17 is a block diagram of a data trainer according to an embodiment.

FIG. 17 is a block diagram of a data trainer according to an embodiment.

Referring to FIG. 17, the data trainer 1310 may include a data obtainer 1310-1, a pre-processor 1310-2, a training data selector 1310-3, a model trainer 1310-4, and a model evaluator 1310-5.

The data obtainer 1310-1 may obtain data necessary for estimating a situation. The data obtainer 1310-1 may obtain data necessary for training for situation estimation. The data obtainer 1310-1 may receive data from a server.

For example, the data obtainer 1310-1 may receive a surrounding image of the vehicle 1. The surrounding image may include a plurality of images (or frames). For example, the data obtainer 1310-1 may receive a moving picture through a camera of an electronic device including the data trainer 1310 or through an external camera (e.g., a CCTV or a black box) capable of communicating with the electronic device including the data trainer 1310. The camera may include at least one image sensor (e.g., a front sensor or a rear sensor), a lens, an image signal processor (ISP), or a flash (e.g., a light emitting diode (LED) or a xenon lamp).

For example, the data obtainer 1310-1 may receive data through an input device (e.g., a microphone, a camera, or a sensor) of an electronic device. Alternatively, the data obtainer 1310-1 may obtain data through an external device that communicates with the electronic device.

The pre-processor 1310-2 may pre-process obtained data such that the obtained data may be used in training for situation estimation. The pre-processor 1310-2 may process the obtained data in a preset format such that the model trainer 1310-4, which will be described later, may use the obtained data for training for situation estimation. For example, the pre-processor 1310-2 may generate one synthesized image by overlapping at least some of a plurality of images (or frames) that constitute at least a portion of an input moving picture, based on a common region included in each of the plurality of images. In this case, a plurality of synthesized images may be generated from a single moving picture. The common region may be a region including a common object (e.g., objects, animals and plants, or people) that is the same or similar in each of the plurality of images. Alternatively, the common region may be a region of which a color, a shade, an RGB value, or a CMYK value is the same or similar in each of the plurality of images.

The training data selector 1310-3 may select data necessary for training from among pieces of pre-processed data. The selected data may be provided to the model trainer 1310-4. The training data selector 1310-3 may select the data necessary for training from among the pre-processed data, according to the preset criterion for situation estimation. The training data selector 1310-3 may select data according to a criterion previously set due to training by the model trainer 1310-4, which will be described later.

For example, data related to objects that may affect the driving path of the vehicle 1, for example, other vehicles, obstacles, and a pedestrian, may be selected.

The model trainer 1310-4 may train a criterion regarding how to estimate a situation, based on the training data. The model trainer 1310-4 may train a criterion regarding which training data is to be used for situation estimation.

The model trainer 1310-4 may train a data recognition model for use in situation estimation, by using the training data. In this case, the data recognition model may be a previously established model. For example, the data recognition model may be a model previously established by receiving basic training data (for example, a sample image).

The data recognition model may be established in consideration of, for example, an application field of a recognition model, a purpose of training, or computer performance of a device. The data recognition model may be, for example, a model based on a neural network. For example, a model, such as a CNN, a deep neural network (DNN), a recurrent neural network (RNN), or a bidirectional recurrent DNN (BRDNN), may be used as the data recognition model, but embodiments are not limited thereto.

According to various embodiments, when a plurality of data recognition models that are pre-established exist, the model trainer 1310-4 may determine a data recognition model having a high relationship between input training data and basic training data, as a data recognition model to be trained In this case, the basic training data may be pre-classified for each type of data, and the data recognition model may be pre-established for each type of data. For example, the basic learning data may be pre-classified according to various standards such as an area where the learning data is generated, a time for which the learning data is generated, a size of the learning data, a genre of the learning data, a generator of the learning data, and a type of the object in the learning data.

The model trainer 1310-4 may train the data recognition model by using a training algorithm including, for example, error back-propagation or gradient descent.

The model trainer 1310-4 may train the data recognition model through supervised learning that uses, for example, the training data as an input value. The model trainer 1310-4 may train the data recognition model through unsupervised learning to find a criterion for situation estimation, by self-training a type of data necessary for situation estimation without supervision, for example. The model trainer 1310-4 may train the data recognition model through reinforcement learning using a feedback about whether a result of the situation determination according to training is right, for example.

When the data recognition model is trained, the model trainer 1310-4 may store the trained data recognition model. In this case, the model trainer 1310-4 may store the trained data recognition model in a memory of an electronic device including the data recognizer 1320. Alternatively, the model trainer 1310-4 may store the trained data recognition model in a memory of an electronic device including the data recognizer 1320, which will be described later. Alternatively, the model trainer 1310-4 may store the trained data recognition model in a memory of a server that is connected with the electronic device via a wired or wireless network.

In this case, the memory that stores the trained data recognition model may also store, for example, a command or data related to at least one other component of the electronic device. The memory may also store software and/or a program. The program may include, for example, a kernel, a middleware, an application programming interface (API), and/or an application program (or an application).

When the model evaluator 1310-5 inputs evaluation data to the data recognition model and a recognition result that is output from the evaluation data does not satisfy a predetermined criterion, the model evaluator 1310-5 may enable the model trainer 1310-4 to train again. In this case, the evaluation data may be preset data for evaluating the data recognition model.

For example, when the number or percentage of pieces of evaluation data that provide inaccurate recognition results from among recognition results of the trained data recognition model with respect to the evaluation data exceeds a preset threshold, the model evaluator 1310-5 may evaluate that the predetermined criterion is not satisfied. For example, when the predetermined criterion is defined as 2% and the trained data recognition model outputs wrong recognition results for more than 20 pieces of evaluation data from among a total of 1000 pieces of evaluation data, the model evaluator 1310-5 may evaluate that the trained data recognition model is not appropriate.

When there are a plurality of trained data recognition models, the model evaluator 1310-5 may evaluate whether each of the plurality of trained data recognition models satisfies the predetermined criterion, and may determine, as a final data recognition model, a data recognition model that satisfies the predetermined criterion. In this case, when a plurality of models satisfy the predetermined criterion, the model evaluator 1310-5 may determine one or a predetermined number of models that are preset in a descending order of evaluation scores as final data recognition models.

At least one of the data obtainer 1310-1, the pre-processor 1310-2, the training data selector 1310-3, the model trainer 1310-4, and the model evaluator 1310-5 in the data trainer 1310 may be manufactured in the form of at least one hardware chip and may be mounted on an electronic device. For example, at least one of the data obtainer 1310-1, the pre-processor 1310-2, the training data selector 1310-3, the model trainer 1310-4, and the model evaluator 1310-5 may be manufactured in the form of a dedicated hardware chip for AI, or may be manufactured as a portion of an existing general-purpose processor (for example, a CPU or an AP) or a processor dedicated to graphics (for example, a GPU) and may be mounted on any of the aforementioned various electronic devices.

The data obtainer 1310-1, the pre-processor 1310-2, the training data selector 1310-3, the model trainer 1310-4, and the model evaluator 1310-5 may be all mounted on a single electronic device, or may be respectively mounted on independent electronic devices. For example, some of the data obtainer 1310-1, the pre-processor 1310-2, the training data selector 1310-3, the model trainer 1310-4, and the model evaluator 1310-5 may be included in an electronic device, and the others may be included in a server.

For example, at least one of the data obtainer 1310-1, the pre-processor 1310-2, the training data selector 1310-3, the model trainer 1310-4, and the model evaluator 1310-5 may be implemented as a software module. When at least one of the data obtainer 1310-1, the pre-processor 1310-2, the training data selector 1310-3, the model trainer 1310-4, and the model evaluator 1310-5 is implemented as a software module (or a program module including instructions), the software module may be stored in a non-transitory computer-readable recording medium. In this case, the at least one software module may be provided by an OS or by a certain application. Alternatively, some of the at least one software module may be provided by an OS and the others may be provided by a certain application.

Figure 18:
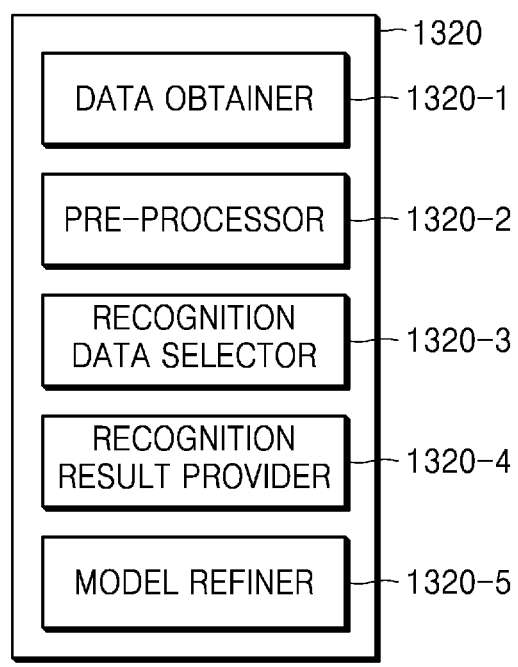
FIG. 18 is a block diagram of a data recognizer according to an embodiment.

FIG. 18 is a block diagram of a data recognizer according to an embodiment.

Referring to FIG. 18, the data recognizer 1320 may include a data obtainer 1320-1, a pre-processor 1320-2, a recognition data selector 1320-3, a recognition result provider 1320-4, and a model refiner 1320-5.

The data obtainer 1320-1 may obtain data necessary for situation determination, and the pre-processor 1320-2 may pre-process the obtained data such that the obtained data may be used for situation determination. The pre-processor 1320-2 may process the obtained data in a preset format such that the recognition result provider 1320-4, which will be described later, may use the obtained data for situation determination.

The recognition data selector 1320-3 may select data necessary for situation determination from among the pre-processed data. The selected data may be provided to the recognition result provider 1320-4. The recognition data selector 1320-3 may select some or all of the pre-processed data, according to the preset criterion for situation determination. The recognition data selector 1320-3 may select data according to a criterion previously set due to training by the model trainer 1310-4, which will be described later.

The recognition result provider 1320-4 may determine a situation by applying the selected data to the data recognition model. The recognition result provider 1320-4 may provide a recognition result that conforms to a data recognition purpose. The recognition result provider 1320-4 may apply the selected data to the data recognition model by using the data selected by the recognition data selector 1320-3 as an input value. The recognition result may be determined by the data recognition model.

According to an embodiment, the recognition result may be provided as a text, a voice, a moving picture, an image, or an instruction (e.g., an application execution instruction or a module function execution instruction).

The model refiner 1320-5 may enable the data recognition model to be refined, based on an evaluation of a recognition result provided by the recognition result provider 1320-4. For example, the model refiner 1320-5 may enable the model trainer 1310-4 to refine the data recognition model, by providing the recognition result provided by the recognition result provider 1320-4 to the model trainer 1310-4.

At least one of the data obtainer 1320-1, the pre-processor 1320-2, the recognition data selector 1320-3, the recognition result provider 1320-4, and the model refiner 1320-5 within the data recognizer 1320 may be manufactured in the form of at least one hardware chip and may be mounted on an electronic device. For example, at least one of the data obtainer 1320-1, the pre-processor 1320-2, the recognition data selector 1320-3, the recognition result provider 1320-4, and the model refiner 1320-5 may be manufactured in the form of a dedicated hardware chip for AI, or may be manufactured as a portion of an existing general-purpose processor (for example, a CPU or an AP) or a processor dedicated to graphics (for example, a GPU) and may be mounted on any of the aforementioned various electronic devices.

The data obtainer 1320-1, the pre-processor 1320-2, the recognition data selector 1320-3, the recognition result provider 1320-4, and the model refiner 1320-5 may be all mounted on a single electronic device, or may be respectively mounted on independent electronic devices. For example, some of the data obtainer 1320-1, the pre-processor 1320-2, the recognition data selector 1320-3, the recognition result provider 1320-4, and the model refiner 1320-5 may be included in an electronic device, and the others may be included in a server.

At least one of the data obtainer 1320-1, the pre-processor 1320-2, the recognition data selector 1320-3, the recognition result provider 1320-4, and the model refiner 1320-5 may be implemented as a software module. When at least one of the data obtainer 1320-1, the pre-processor 1320-2, the recognition data selector 1320-3, the recognition result provider 1320-4, and the model refiner 1320-5 is implemented as a software module (or a program module including instructions), the software module may be stored in a non-transitory computer-readable recording medium. In this case, the at least one software module may be provided by an OS or by a certain application. Alternatively, some of the at least one software module may be provided by an OS and the others may be provided by a certain application.

Figure 19:
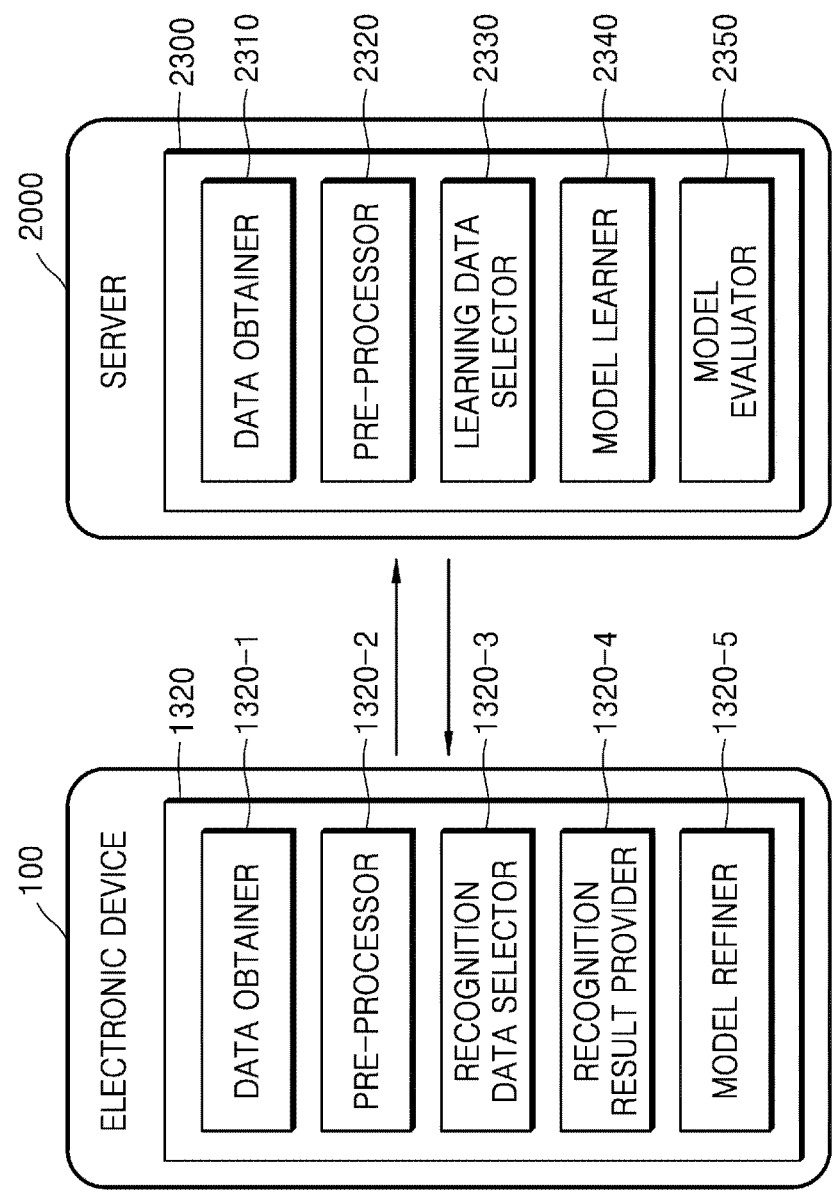
FIG. 19 is a block diagram illustrating an example where an electronic device according to an embodiment and a server interoperate to train and recognize data.

FIG. 19 is a block diagram illustrating an example where an electronic device according to an embodiment and a server interoperate to train and recognize data.

FIG. 19 is a block diagram illustrating an example where the electronic device 100 according to some embodiments and a server 2000 interoperate to train and recognize data.

Referring to FIG. 19, the server 2000 may train a criterion for situation determination, and the electronic device 100 may determine a situation, based on a result of the training performed by the server 2000.

In this case, a model trainer 2340 of the server 2000 may perform a function of the data trainer 1310 of FIG. 17. The model trainer 2340 of the server 2000 may train a criterion regarding what data is used to determine a certain situation and a criterion regarding how to determine a situation by using data. The model trainer 2340 may obtain data for use in training and may apply the obtained data to a data recognition model which will be described later, thereby training the criterion for situation determination.

The recognition result provider 1320-4 of the electronic device 100 may apply the data selected by the recognition data selector 1320-3 to a data recognition model generated by the server 2000, thereby determining a situation. For example, the recognition result provider 1320-4 may transmit the data selected by the recognition data selector 1320-3 to the server 2000, and the server 2000 may request determination of a situation by applying the data selected by the recognition data selector 1320-3 to a data recognition model. The recognition result provider 1320-4 may receive information about the situation determined by the server 2000 from the server 2000.

For example, the electronic device 100 may transmit an image frame to the server 2000, and the server 2000 may request detection of an object by applying the image frame to the data recognition model. The electronic device 100 may receive information about object detection determined by the server 2000 from the server 2000.

Alternatively, the recognition result provider 1320-4 of the electronic device 100 may receive the data recognition model generated by the server 2000 from the server 2000, and may determine a situation by using the received data recognition model. In this case, the recognition result provider 1320-4 of the electronic device 100 may determine a situation by applying the data selected by the recognition data selector 1320-3 to the data recognition model received from the server 2000.

For example, the electronic device 100 may detect an object by applying the image frame to the data recognition model received from the server 2000.

The devices described herein may comprise a processor, a memory for storing program data and executing it, a permanent storage unit such as a disk drive, a communications port for handling communications with external devices, and user interface devices, including a touch panel, keys, buttons, etc. For example, when software modules or algorithms are involved, these software modules may be stored as program instructions or computer readable codes executable on the processor in a computer-readable recording medium. Examples of the computer-readable recording medium include magnetic storage media (e.g., read-only memory (ROM), random-access memory (RAM), floppy disks, hard disks, etc.), and optical recording media, (e.g., compact disc-ROM (CD-ROM) and digital versatile discs (DVDs)). The computer readable recording medium can also be distributed over network coupled computer systems so that the computer readable code is stored and executed in a distributive manner. This media can be read by the computer, stored in the memory, and executed by the processor.

The present embodiments may be described in terms of functional block components and various processing steps. Such functional blocks may be realized by any number of hardware and/or software components configured to perform the specified functions. For example, embodiments may employ various integrated circuit (IC) components, e.g., memory elements, processing elements, logic elements, look-up tables, and the like, which may carry out a variety of functions under the control of one or more microprocessors or other control devices. Similarly, where the elements are implemented using software programming or software elements, the present embodiments may be implemented with any programming or scripting language such as C, C++, Java, assembler language, or the like, with the various algorithms being implemented with any combination of data structures, objects, processes, routines or other programming elements. The functional blocks may be implemented in algorithms that are executed on one or more processors. Furthermore, the present embodiment described herein could employ any number of conventional techniques for electronics configuration, signal processing and/or control, data processing and the like. The words "mechanism", "element", "means", and "configuration" are used broadly and are not limited to mechanical or physical embodiments, but can include software routines in conjunction with processors, etc.

The invention claimed is:

1. An electronic device for assisting vehicle driving, the electronic device comprising:
a plurality of cameras configured to capture a surrounding image around a vehicle;
at least one sensor configured to sense an object around the vehicle; and
a processor configured to:
obtain, during vehicle driving, a plurality of image frames as the surrounding image of the vehicle is captured based on a preset time interval by using the plurality of cameras,
obtain information about a time point when and a location where the object has been sensed by the at least one sensor,
extract, from among the obtained plurality of image frames, an image frame captured at the time point by a camera positioned closest to the location from among the plurality of cameras,
perform object detection from the extracted image frame, and
perform object tracking of tracking a change in the object, from a plurality of image frames obtained after the extracted image frame.

2. The electronic device of claim 1, wherein the processor is further configured to perform the object detection for detecting an object included in each of the plurality of image frames obtained using the plurality of cameras or object tracking for tracking a change in the object included in each of the plurality of image frames, with respect to each of the plurality of image frames, based on a preset cycle.

3. The electronic device of claim 2, wherein the processor is further configured to perform the object tracking from the plurality of image frames obtained using the plurality of cameras, until the object is sensed using the at least one sensor.

4. The electronic device of claim 2, wherein the processor is further configured to perform the object detection from an image frame obtained using one camera from among the plurality of image frames obtained using the plurality of cameras at an identical time point, and perform the object tracking from an image frame obtained using a remaining camera.

5. The electronic device of claim 4, wherein the processor is further configured to change a camera that obtains an image frame on which the object detection is to be performed, from among the plurality of cameras, every time when the plurality of image frames are obtained using the plurality of cameras.

6. The electronic device of claim 4,
wherein the plurality of cameras comprises first and second cameras, and
wherein the processor is further configured to:
perform the object detection on an image frame obtained using the first camera at a first time point, and
perform the object detection on an image frame obtained using the second camera at a second time point that is after the preset time interval from the first time point.

7. The electronic device of claim 6, wherein the processor is further configured to perform the object tracking on an image frame obtained using the first camera at the second time point.

8. The electronic device of claim 2, wherein the processor is further configured to:
while performing the object tracking on the obtained image frame, calculate a confidence value of a result of the object tracking, and
based on determining that the calculated confidence value is less than or equal to a threshold value, perform the object detection from an image frame of which the confidence value is determined to be less than or equal to the threshold value.

9. The electronic device of claim 1, wherein the processor is further configured to:
while a plurality of objects are sensed using the at least one sensor, extract a plurality of image frames corresponding to time points when and locations where the plurality of objects have been sensed, from among a plurality of image frames obtained at an identical time point, determine one image frame, based on a preset priority, from among the extracted plurality of image frames, and preferentially perform the object detection on the determined image frame.

10. The electronic device of claim 1,
wherein the processor comprises a graphics processing unit (GPU), and
wherein the object detection is performed by the GPU.

11. The electronic device of claim 1, wherein the processor is further configured to perform object detection by using a data recognition model based on a neural network.

12. An operation method of an electronic device for assisting vehicle driving, the operation method comprising:
obtaining, during vehicle driving, a plurality of image frames as a surrounding image around a vehicle is captured based on a preset time interval by using a plurality of cameras;
obtaining information about a time point when and a location where an object has been sensed by at least one sensor included in the electronic device;
extracting, from among the obtained plurality of image frames, an image frame captured at the time point by a camera positioned closest to the location from among the plurality of cameras;
performing object detection from the extracted image frame; and
performing object tracking of tracking a change in the object, from a plurality of image frames obtained after the extracted image frame.

13. The operation method of claim 12, further comprising:
performing the object detection for detecting an object included in each of the plurality of image frames obtained using the plurality of cameras or the object tracking for tracking a change in the object included in each of the plurality of image frames, with respect to each of the plurality of image frames, based on a preset cycle.

14. The operation method of claim 13, wherein the performing of the object detection or the object tracking comprises performing the object tracking from the plurality of image frames obtained using the plurality of cameras, until the object is sensed using the at least one sensor.

15. A non-transitory computer-readable recording medium having recorded thereon a computer program, which, when executed by a computer, performs the method of claim 12.

16. The electronic device of claim 1, wherein the object is a pedestrian on a path of the driving.

* * * * *